United States Patent [19]

Katayose et al.

[11] Patent Number: 4,989,223
[45] Date of Patent: Jan. 29, 1991

[54] SERIAL CLOCK GENERATING CIRCUIT

[75] Inventors: Tsuyoshi Katayose; Yukio Maehashi, both of Tokyo, Japan

[73] Assignee: NEC Corporation, Tokyo, Japan

[21] Appl. No.: 441,112

[22] Filed: Nov. 27, 1989

[30] Foreign Application Priority Data

Nov. 25, 1988 [JP] Japan .................... 63-298512

[51] Int. Cl.$^5$ ............................ H04L 7/00
[52] U.S. Cl. ...................... 377/39; 375/110; 377/33; 328/63
[58] Field of Search ............ 377/39, 33; 328/63; 307/269; 375/110

[56] References Cited

U.S. PATENT DOCUMENTS

| | | | |
|---|---|---|---|
| 3,594,551 | 7/1971 | Shearer | 377/39 |
| 4,101,761 | 7/1978 | Merryman | 377/39 |
| 4,628,269 | 12/1986 | Hunninghaus et al. | 328/63 |
| 4,856,029 | 8/1989 | Geyer et al. | 375/110 |
| 4,873,624 | 10/1989 | Sibigtroth | 377/39 |

Primary Examiner—John S. Heyman
Attorney, Agent, or Firm—Foley & Lardner, Schwartz, Jeffery, Schwaab, Mack, Blumenthal & Evans

[57] ABSTRACT

A serial clock generating circuit for generating a serial clock in phase with a clock included in a received serial data on the basis of an input clock having a frequency N times of a serial data transfer rate of the received serial data, comprises an edge detector for detecting a level transition of the received serial data so as to generate a level transition detection signal, and a counter for counting the input clock. A first comparison register is provided for comparing a count value of the counter with a first programmable predetermined value at each one counting operation of the counter, so as to generate a first coincidence signal when the count value of the counter is coincident with the first programmable predetermined value. A second comparison register is provided for comparing the count value of the counter with a second programmable predetermined value at each one counting operation of the counter, so as to generate a second coincidence signal when the count value of the counter is coincident with the second programmable predetermined value. A capture/comparison register operates to capture and store the count value of the counter when the level transition detection signal is generated, and also to compare the count value of the counter with the stored count value at each one counting operation of the counter, so as to generate a third coincidence signal when the count value of the counter is coincident with the stored count value. There is provided a clear circuit for generating a clear signal to the counter when either the first coincidence signal or the third coincidence signal is generated. A serial clock generator generates a serial clock signal on the basis of the second coincidence signal and the clear signal.

7 Claims, 12 Drawing Sheets

SERIAL CLOCK GENERATING CIRCUIT

BACKGROUND OF THE INVENTION

1. Field of the Invention

The present invention relates to a serial clock generator, and more specifically to serial clock generating circuit for use in a serial data transfer circuit include in data processing systems including microcomputers.

2. Description of Related Art

Conventionally, a serial data transfer circuit, which is one of various perheral hardwares of data processing systems, has been widely used in comparison with a parallel interface utilizing a bus connection, because the number of signal lines required for interfacing is small and therefore is economic, and because of other reasons.

On the other hand, data processing systems have been required to communicate with various peripheral devices and other data processing systems. However, serial transfer rates being used are different dependently upon the devices and the systems. Therefore, a serial data transfer circuit included in the data processing system has been desired to easily deal with serial transfer rates of a wide extent, for example by a software processing with a central processing unit.

Furthermore, in a serial transfer system in which an interface signal line does not include a clock line for synchronizing transmission and receipt of the transfer data, a receiving side of the serial data transfer is requiring to have a circuit for generating a serial clock for receiving a transmitted data.

The serial clock generating circuit provided at the receiving side of the serial data transfer has been adapted to receive a basic clock having a frequency N times (for example, 16 times or 32 times) of a serial transfer rate which is previously determined in accordance with a Protocol, and to frequency-dividing the basic clock by N so as to generate an internal clock having the same period as that of the serial transfer rate. In addition, the internal clock is phase-adjusted to become in phase with a signal level transition of the received serial data.

This phase-matching of the internal clock with the received serial data is ceaselessly performed at each signal level transition on a serial data transfer signel line. The reason for this is that even if the phase-matching has been realized, a phase-mismatching will occur between a serial clock of the transmission side and a serial clock of the receiving side due to various causes such a delay of a transfer path and a change of temperature of environment.

As mentioned hereinbefore, in the serial transfer system in which an interface signal line does not include a clock line for synchronizing transmission and receipt of the transfer data, and a receiving side of the serial data transfer is required to have a circuit for generating an internal serial clock for receiving a transmitted data, the serial clock generating circuit used at the receiving side detects the signal level transition on a receiving serial data line and synchronize the phase of the internal serial clock. Therefore, the serial clock generating circuit deals with only a serial data transfer in accordance with a protocol in which transfer control procedure and a code transfer system for a serial data transfer are determined in such a manner that a signal level on a receiving data signal line will change without exception within a constant period allowed in the transfer system. One example of the protocol is the Non-Return-to-Zero-Invert format (NRZI format) of Japanese Industrial Standard JIS C 6363-1978 to 6365-1978: High level Data Link Control Procedure.

A conventional serial clock generating circuit capable of dealing with the above mentioned serial data transfer could have adjusted the internal serial clock into phase to the signal level transition even if the transfer timing of the serial data transfer accidentially changes. However, the conventional serial clock generation circuit has been such that an output signal of a binary counter having a fixed bit length is used for generation of an internal serial clock. Therefore, conventional serial clock generation circuit could not generate an internal serial clock corresponding to any serial data transfer rate used in a necessary data transfer, on basis of a count clock generated a single quartz-crystal oscillator. In other words, if a count clock is fixed by the quartz-crystal oscillator being used, the serial clock generated also becomes fixed. In addition, it is not easy to modify the circuit so that the bit length and the count number can be changed in a software manner.

Therefore, in the case that a data processing system has to be capable of dealing with a plurality of serial data transfers having different transfer rates, (1) there have been provided a plurality of quartz-crystal oscillators so that one of the quartz-crystal oscillators is selected in a software manner so as to supply a required count clock to the serial clock generating circuit, or (2) there is provided a frequency-division circuit receiving a clock generated by a single quartz-crystal oscillator and for generating in a software manner a count clock in accordance with each of different serial transfer rates, the count clock thus generated being supplied to the serial clock generating circuit.

However, the provision of the plurality of quartz-crystal oscillators will results in an increased number of parts in an application system, and hence, in an increased cost of the application system.

In the case of the software-controlled frequency-division circuit provided in addition to the serial clock generating circuit, on the other hand, there must be used a quartz-crystal oscillator having an oscillation frequency of as high as possible, in order to ensure that the serial clock generating circuit can generate a plurality of serial clocks having arbitrary different frequencies without decreasing a resolution of the serial clock generating circuit, since an ordinary frequency-division circuit is composed of a binary counter. However, it can ordinarily be said that the higher the oscillation frequency becomes, the expensive the quartz-crystal becomes, and the larger the power consumption of the circuit becomes.

SUMMARY OF THE INVENTION

Accordingly, it is an object of the present invention to provide a serial clock generating circuit which has overcome the above mentioned defect of the conventional one.

Another object of the present invention is to provide a serial clock generating circuit receiving a fixed frequency count clock and capable of generating an internal serial clock corresponding to an arbitrary transfer rate.

The above and other objects of the present invention are achieved in accordance with the present invention by a serial clock generating circuit for generating a serial clock in phase with a clock included in a received serial data on the basis of an input clock having a frequency N times of a serial data transfer rate of the recevied serial data, comprising means for detecting a level transition of the received serial data so as to generate a level transition detection signal, means for counting the input clock, first comparison means for comparing a count value of the count means with a first programmable predetermined value at each one counting operation of the count means, so as to generate a first coincidence signal when the count value of the count means is coincident with the first programmable predetermined value, second comparison means for comparing the count value of the count means with a second programmable predetermined value at each one counting operation of the count means, so as to generate a second coincidence signal when the count value of the count means is coincident with the second programmable predetermined value, third comparison means having a first function of capturing and storing the count value of the count means when the level transition detection signal is generated, a second function of comparing the count value of the count means with the stored count value at each one counting operation of the count means, so as generate a third coincidence signal when the count value of the count means is coincident with the stored count value, means for generating a clear signal to the count means so as to clear the count means when either the coincidence signal or the third coincidence signal is generated, and means for generating a serial clock signal on the basis of the second coincidence signal and the clear signal.

With the above mentioned arrangement, the count means is cleared by either the third coincidence signal generated by the third comparison means having the capture function of fetching as a reference value the count value of the count means when the signal level of the received serial data changes, or the first coincidence signal generated by the first comparison means having the first predetermined value which can be set as a reference value in a software manner. On the other hand, the serial clock is generated by the clear signal generated on basis of the first and third coincidence signals as mentioned above, and by the second coincidence signal generated by the second comparison means having the second predetermined value which can be set as a reference value in a software manner. In other words, a period of the serial clock thus generated is controlled by the clear signal and the second coincidence signal. Therefore, it is possible to easily generate, on the basis of a count clock having a fixed frequency, the serial clock corresponding to an arbitrary serial transfer rate.

The above and other objects, features and advantages of the present invention will be apparent from the following description of preferred embodiments of the invention will reference to the accompanying drawings.

DESCRIPTION OF THE PREFERRED EMBODIMENTS

The following is a detailed description of embodiments of serial clock generating circuit in accordance with the present invention. However, a transfer control procedured used for a data transfer will be not explained for simplification of the description.

Figure 1:
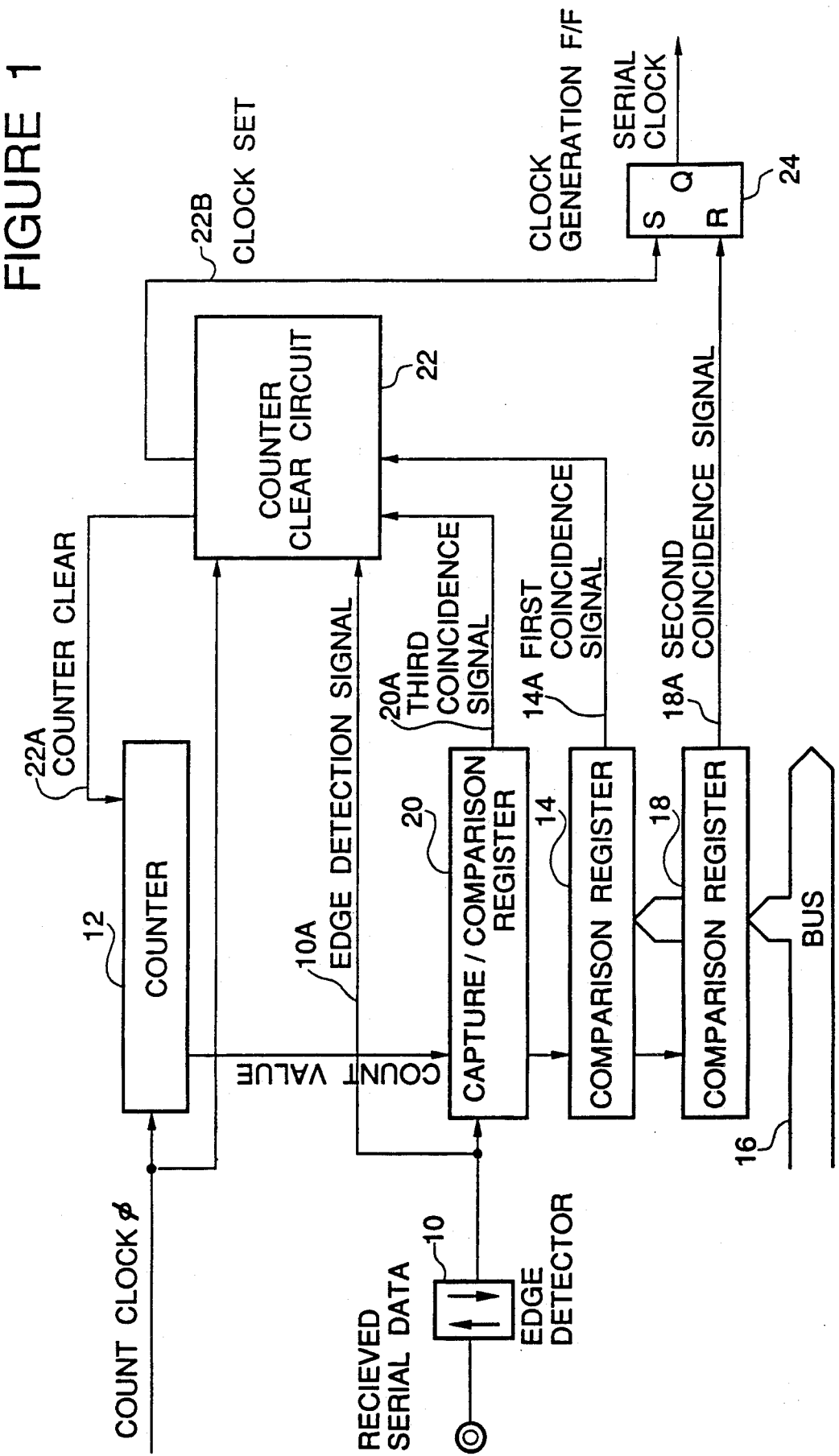
FIG. 1 is a block diagram of a first embodiment of the serial clock generating circuit in accordance with the present invention.

Referring to FIG. 1, there is shown a diagram of a first embodiment of the serial clock generating circuit in accordance with the present invention, which deals with the NRZI code data transfer.

The shown serial clock generating circuit comprises an edge detection circuit 10 coupled to receive a received serial data for generating an edge detection signal 10A at each time that a signal level transition occurs in the received serial data, and a 4-bit counter 12 coupled to receive and count a count clock $\phi$ having a frequency 16 times of that of a serial data transfer rate. A 4-bit comparison register 14 is coupled to a bus 16 so as to be set with a first reference number and is also coupled to receive a count value of the counter 12. The comparison register 14 operates to compare the count value of the counter 12 with the set or stored first reference number at each time that the counter 12 counts each one count clock. When the count value of the counter 12 is coincident with the set or stored first reference number, the comparison register 14 generates a dirst coincidence signal 14A. Another 4-bit comparison register 18 is coupled to the bus 16 so as to be set with a second reference number and is also coupled to receive the count value of the counter 12. The comparison register 18 operates to compare the count value of the counter 12 with the set or stored second reference number at each time that the counter 12 counts each one count clock. When the count value of the counter 12 is coincident with the set or stored second reference numer, the comparison register 18 generates a second coincidence signal 18A.

Furthermore, a capture/comparison register 20 is coupled to receive the edge detection signal 10A and to the count value of the counter 12. This capture/comparison register 20 has a function of capturing and storing the count value oif the counter 12 in response to the edge detection signal 10A, namely at each time that the signal level transition occurs in the received serial data. The capture/comparison register 20 has another function of comparing the count value of the counter 12 with the stored count value at each time that the counter 12 counts each one count clock, and of generating a third coincidence signal 20A when the count value of the counter 12 is coincident with the stored count value.

The shown serial clock generating circuit also includes a counter clear circuit 22 coupled to receive the count clock φ, the edge detection signal 10A, and the first and third coincidence signals 14A and 20A. This counter clear circuit 22 operates to generate a counter clear signal 22A for cleaning the counter 12 to "0", and a clock set signal 22B to a set terminal of a clock generation flipflop 24. The clock generation flipflop 24 has a reset terminal connected to receive the second coincidence signal 18A. Thus, this clock generation flipflop 24 generates at its Q output a serial clock which is brought to "1" in response to the clock set signal 22B and to "0" in response to the second coincidence signal 18A.

This clock generation flipflop 24 is designed to preferentially assume the set operation when the set operation and the reset operation conflict with each other.

More specifically, the comparison registers 14 and 18 are respectively set with the first and second reference numbers through the bus in a software manner by a central processing unit (not shown) of a microcomputer used in a data processing system (not shown) including the shown serial clock generating circuit. Therefore, the comparison registers 14 and 18 can be respectively set with arbitrary reference numbers.

However, the comparison registers 14 and 18 are respecively set with reference numbers which fulfill such a reaction that the set value of the comparison register 18 is less than the set value of the comparison register 14. For example, the comparison register 14 is set with a basis count number of the counter 12, namely, a maximum count value of the counter 12. Therefore, the set value of the comparison register 14 determines one period of the serial clock generated.

$$\frac{\text{Frequency of Count clock}}{\text{Serial Transfer Rate}} - 1$$

(Therefore, in the shown embodiment $16 - 1 = 15$)
On the other hand, the comparison register 18 is set with a half of the basic count number of the counter 12. Therefore, the set value of the comparison register 18 determines a duty of the serial clock generated.

$$\frac{\text{Frequency of Count clock}}{\text{Serial Transfer Rate}} \times (1/2) - 1$$

Figure 3:
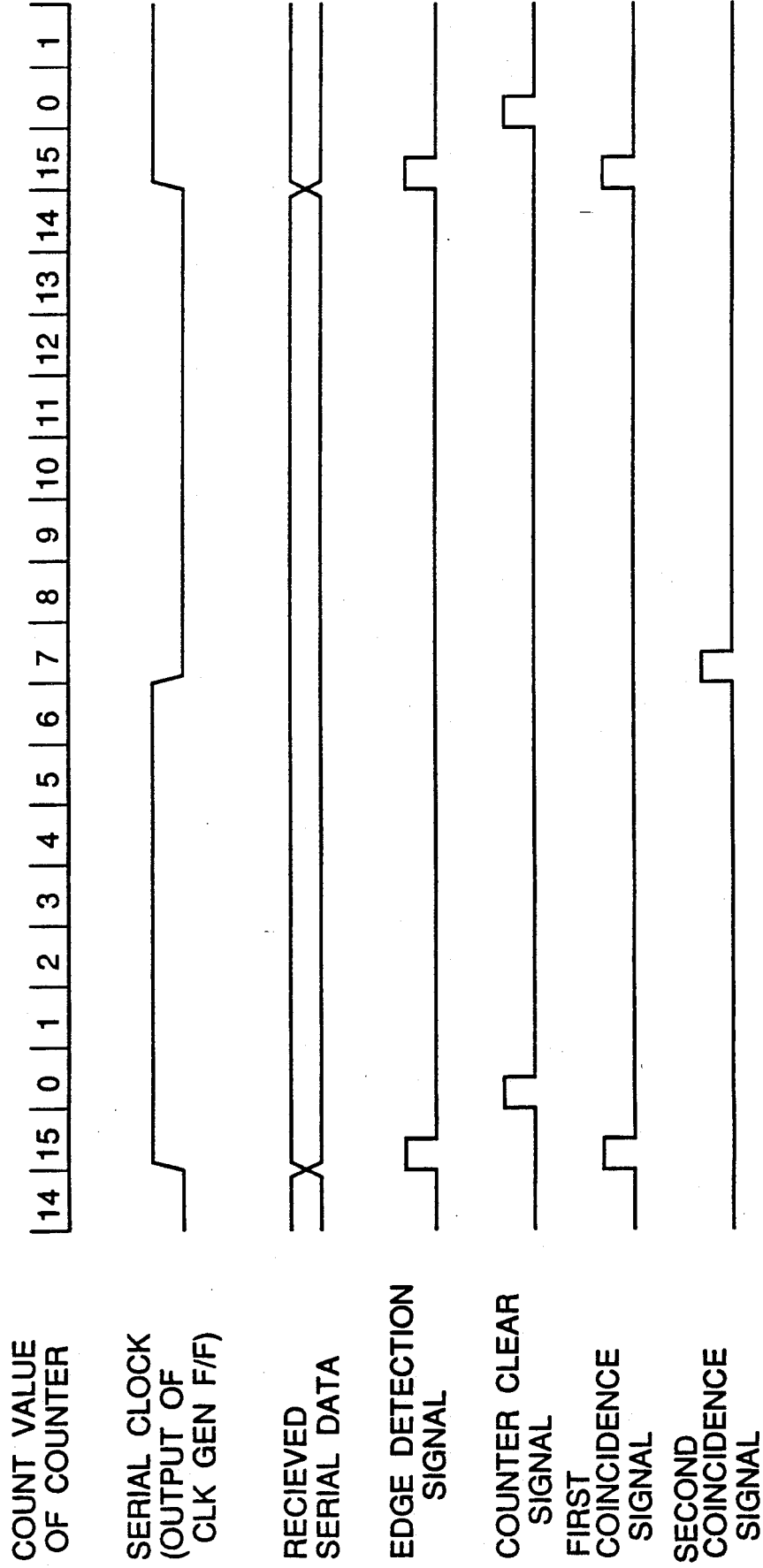
FIG. 3 is a timing chart illustrating the operation of the serial clock generating circuit shown in FIG. 1.

(Therefore, in the shown embodiments $16/2 - 1 = 7$)
In the case that the first and second reference numbers as mentioned above as set to the first and second comparison registers 14 and 18, these comparison registers 14 and 18 generates the first and second coincidence signals 14A and 18A ata timing as shown in FIG. 3 as compared with the advancement of the count value of the counter 12. Namely, when the count value of the counter 12 becomes "15", the first coincidence signal 14A of "1" is generated, and when the count value of the counter 12 becomes "7", the second coinceidence signal 18A of "1" is generated.

Figure 2:
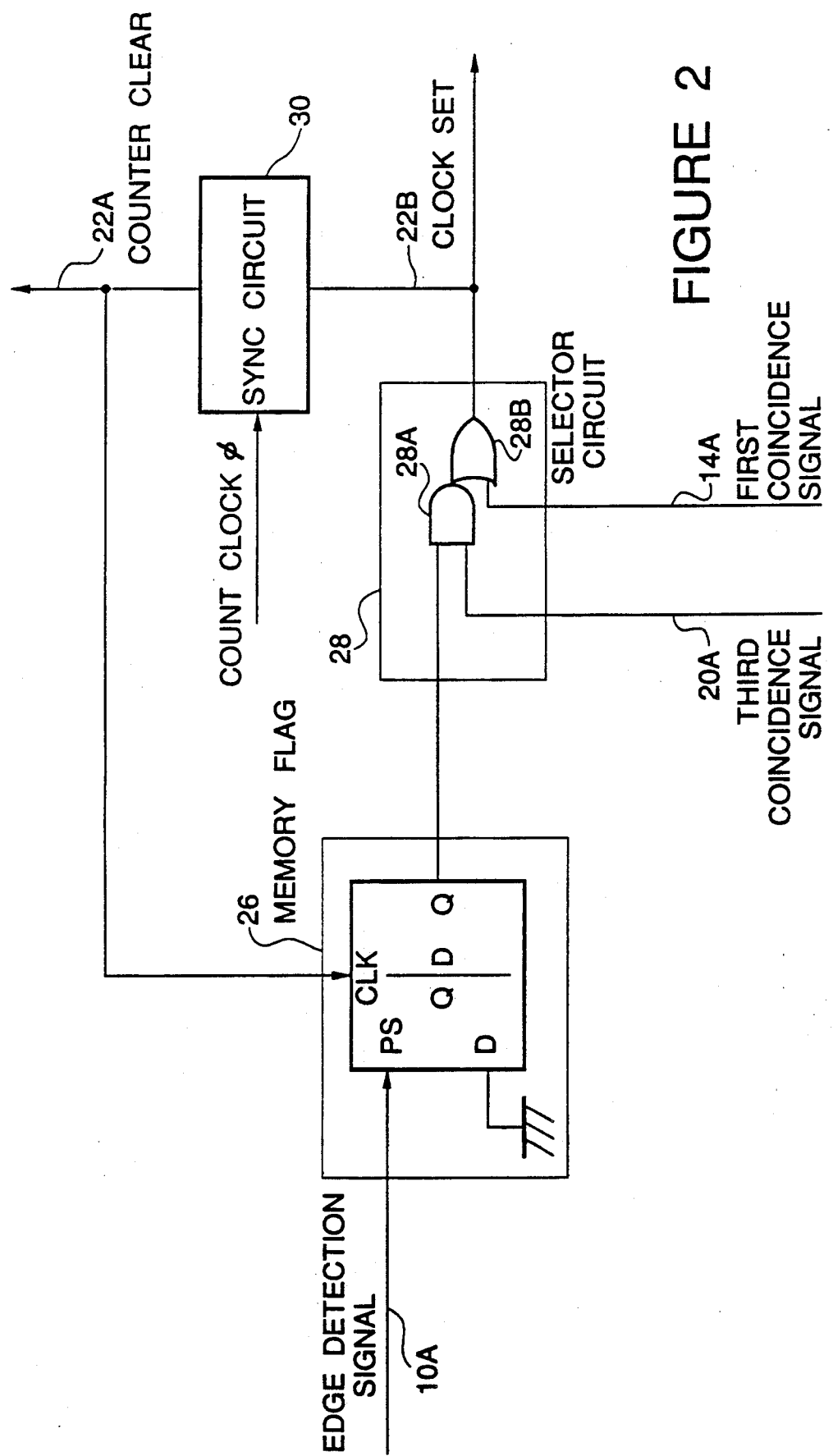
FIG. 2 is a block diagram of the counter clear circuit used in the serial clock generating circuit shown in FIG. 1.

Turning to FIG. 2, there is shown a block diagram of the counter clear circuit 22. The counter clear circuit 22 includes a memory flag 26, which can be composed of a 2-bit shift register having a preset function. The 2-bit shift register 26 receives the counter clear signal 22A as a shift clock and also receives and stores the edge detection signal 10A in response to the counter clear signal 22A and then transfers the stored edge detection signal 10A to a selector circuit 28 in response to the counter clear signal 22A. More specifically, when the edge detection signal 10A is rendered active, a low place bit of the memory flag 26 is preset with "1". Thereafter, if the counter clear signal 22A is generated to clear the counter 12, the memory flag 26 shifts its internal bits so that the "1" stored in the low place bit is shifted to a high place bit of the memory flag 26 and therefore outputted to the selector circuits 28. At this time, the low place bit is brought to "0" and the content of the high place bit before the shift operation is lost.

The selector circuit 28 is composed of an AND gate 28A having a first input connected an output of the memory flag 26 and a second input connected to receive the third coincidence signal 20A, and an OR gate 28B having a first input connected to an output of the AND gate and a second input connected to receive the first coincidence signal 14A. An output of the OR gate 28B generates the clock set signal 22B.

Namely, if the output of the memory flag 26 is active, the clock set signal 22B is generated by the third coincidence signal 20A outputted from the capture/comparison register 20. In addition, the clock set signal 22B is generated by the first coincidence signal 14A outputted from the comparison register 14, regardless of the content of the memory flag 26.

The clock set signal 22B is applied to a synchronous circuit 30, which receives the count clock φ. This synchronous circuit 30 operates to generate the counter clear signal 22A in response to the clock set signal 22B but is synchronism with the count clock φ. Therefore, the counter clear signal 22A is generated at a timing which is later than the clock set signal 22B by one count clock φ. In other words, the counter 12 is cleared at the counting timing of the counter 12 next to the generation of the first or third coincidence signal 14A or 20A.

Now, an operation of the serial clock generating circuit shown in FIG. 1 will explained with reference to FIG. 3.

First, the following is the relation between the serial clock and the count value of the counter 12 under the condition in which the serial data is precisely transferred at a transfer rate predetermined in a data transfer system (one sixteenth of the count clock φ in the shown embodiment) and the received serial data is prefectly in phase with the count clock φ. In addition, assume that the signal level transition has not occurred on the received serial data as an initial condition. Namely, the memory flag 26 of the counter clear circuit 22 does not store the edge detection signal 10A.

Since the count clock φ is set to be ata frequency 16 times of the serial data transfer rate, if the counter 12 starts its count operation from the count value "0" as shown in FIG. 3, the second coincidence signal 18A is generated when the count value of the counter 12 reaches the second reference number set in the second comparison register 18, and therefore, the clock generation flipflop 24 is reset so that the serial clock is brought to "0".

As a result of the advancement of th count operation, when the count value of the counter 12 reaches the first reference number set in the first comparison register 14, the first coincidence signal 14A is supplied to the counter clear circuit 11, which generates the clock set signal 22B to the set terminal of the clock generation flipflop 24 so that the serial clock is brought to "1". The counter clear circuit 22 generates the counter clear signal 22A at the counting timing of the counter 12 next to the generation of the first coincidence signal 14A. Thus, the counter 12 is cleared to "0" and therefore, the counter restarts its count operation from "0".

In this case, since the transfer rate of the serial data is precisely one-sixteenth of th count clock $\phi$, the timing of the level transition of the received serial data is perfectly consistent with the timing of one period of the serial clock generated.

In other words, the period of time from the moment that the counter 12 starts its count operation from the count value "0" to the moment that the count clear signal 22A is generated, corresponds to a reception time for one bit of the serial data. In addition, the period of time from the moment that the second coincidence signal 18A is generated by the second comparison register 18 to the moment that the clock set signal 22B is generated, corresponds to one half period of the one bit of the serial data. Therefore, the clock generation flipflop 24 generates the serial clock which falls down at a center of one bit of the serial data.

When the signal level of the received serial data changes from the initial condition after the serial data transfer is started, for example when the signal level of the received data change from a continuous condition of "1" to "0", or when the serial data transfer timing slightly changes, a phase deviation of the serial clock is detected and compensated as follows:

When the signal level of the received serial data has changed, if the count value of the counter 12 is in the extent of "0" to "7", the capture/comparsion register 20 responds to the edge detection signal 10A from the edge detector 10, so as to capture and store the count value of the counter 12. In addition, the edge detection signal 10A is stored in the memory flag 26 of the counter clear circuit 22.

However, since the output of the memory flag 26 is rendered active after the counter clear signal 22A is generated, the count value is compensated after the count operation of the counter 12 advances and the first coincidence signal 14A of the first comparison register 14 is rendered active so as to clear the counter 12 and reset the clock generation flipflop 24.

After the counter 12 starts its count operation from "0" again, when the count value of the counter 12 becomes consistent with the stored count value, for example "1" of the capture/comparison register 20, the third concidence signal 20A is generated by the capture/comparison register 20. At this time, since the output of the memory flag 26 has been already rendered active, the counter clear circuit 22 generates the clock set signal 22B so as to get the clock generation flipflop 24. At the next count timing, the counter clear signal 22A is generated. Therefore, the counter 12 is cleared to "0", and continues its count operation from "0", again.

Accordingly, a compensation of +2 in comparison with the inherent count value (16 in this embodiment) is effected.

Similarly, if the count value captured and stored in the capture/comparison register 20 is "0", a compensation of +1 in comparison with the inherent count value (16 in this embodiment) is effected. On the other hand, if the count value captured and stored in the capture-comparison register 20 is "7", a compensation of +8 in comparison with the inherent count value (16 in this embodiment) is effected. At this time, in the clock generation flipflop 24, the set operation due to the clock set signal 22B conflicts with the reset operation due to the second coincidence signal 18A. However, since the set operation is preferential, the output of the clock generation flipflop 24 is brought to "1".

On the other hand, when the signal level of the received serial data has changed, if the count value of the counter 12 is in the extent of "8" to "15", the capture/comparison register 20 responds to the edge detection signal 10A from the edge detector 10, so as to capture and store the count value of the counter 12. In addition, the edge detection signal 10A is stored in the memory flag 26 of the counter clear circuit 22.

However, since the output of the memory flag 26 is rendered active after the counter clear signal 22A is generated, the count value is compensated after the count operation of the counter 12 advances and the first coincidence signal 14A of the first comparison register 14 is rendered active so as to clear the counter 12 and reset the clock generation flipflop 24.

After the counter 12 starts its count operation from "0" again, when the count value of the counter 12 becomes consistent with the second reference value "7" of the second comparion register 18, the second coincidence signal 20A is generated by the second comparison register 20 so as to reset the clock generation flipflop 24. Thereafter, when the count value of the counter 21 becomes consistent with the stored count value, for example "14" of the capture/comparison register 20, the third coincidence signal 20A is generated by the capture/comparison register 20. At this time, since the output of the memory flag 26 has been already rendered active, the counter clear circuit 22 generates the clock set signal 22B so as to set the clock generation flipflop 24. At the next count timing, the counter clear signal 22A is generated. Therefore, the counter 12 is cleared to "0", and continues its count operation from "0" again.

Accordingly, a compensation of −1 in comparison with the inherent count value (16 in this embodiment) is effected.

Similarly, if the count value captured and stored in the capture/comparison register 20 is "8", a compensation of −7 in comparison with the inherent count value (16 in this embodiment) is effected. On the other hand, if the count value captured and stored in the capture/comparison register 20 is "15", a compensation of ±0 in comparison with the inherent count value (16 in this embodiment) is effected. Namely, it means that the serial clock generated is in perfect synchronism with that of the received serial data.

As seen from the above, if the signal transition timing of the received serial data is deviated from the timing in which the count value of the counter 12 is brought to "15", the counter 12 is cleared to "0" so as to compensate the count number, so that the low level outputting time length of the serial clock generated is forcedly changed to effect the phase compensation.

In the above mentioned first embodiment, the bit length of all the counter 12, the first and second comparison registers 14 and 18, and the capture/comparison register 20 is four bits. However, since the reference number or value of each of the comparison registers 14 and 18 can be set in a software manner as mentioned hereinbefore, it is possible to select an arbitrary bit length (for example, 8 bits) for all the counter 12, the first and second comparison register 14 and 18, and the capture/comparison register 20, on the basis of a required maximum serial data transfer rate and an available count clock frequency.

In addition, in the above mentioned embodiment, the count clock $\phi$ has a frequency 16 times of the serial transfer rate. However, it is possible to use arbitrary frequency (for example, 10, 12, 14, 32, and 40 times of the serial transfer rate) which permits equal low level time and high level time of the serial clock generated.

Figure 4:
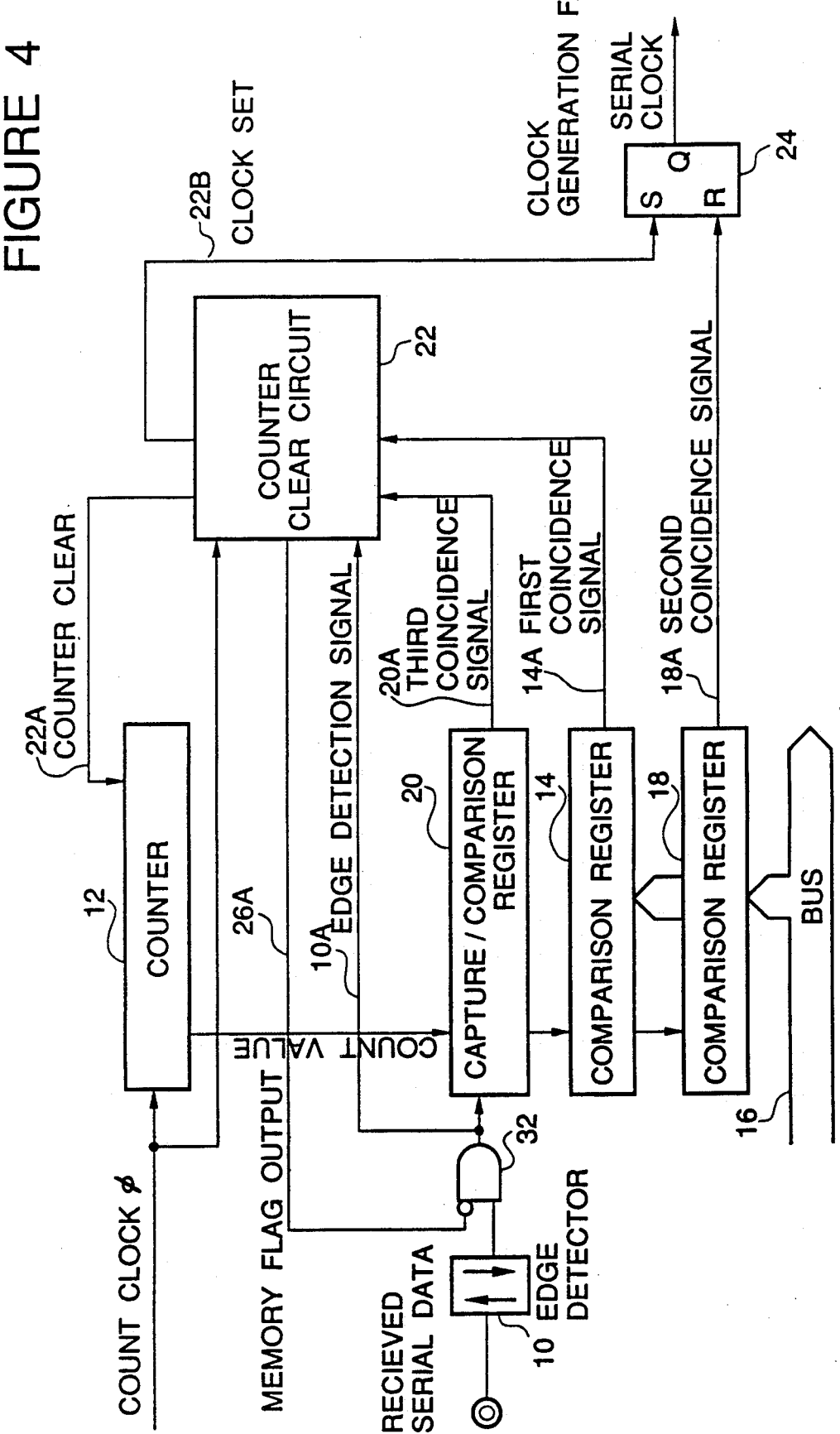
FIG. 4 is a block diagram of a second embodiment of the serial clock generating circuit in accordance with the present invention.
Figure 5:
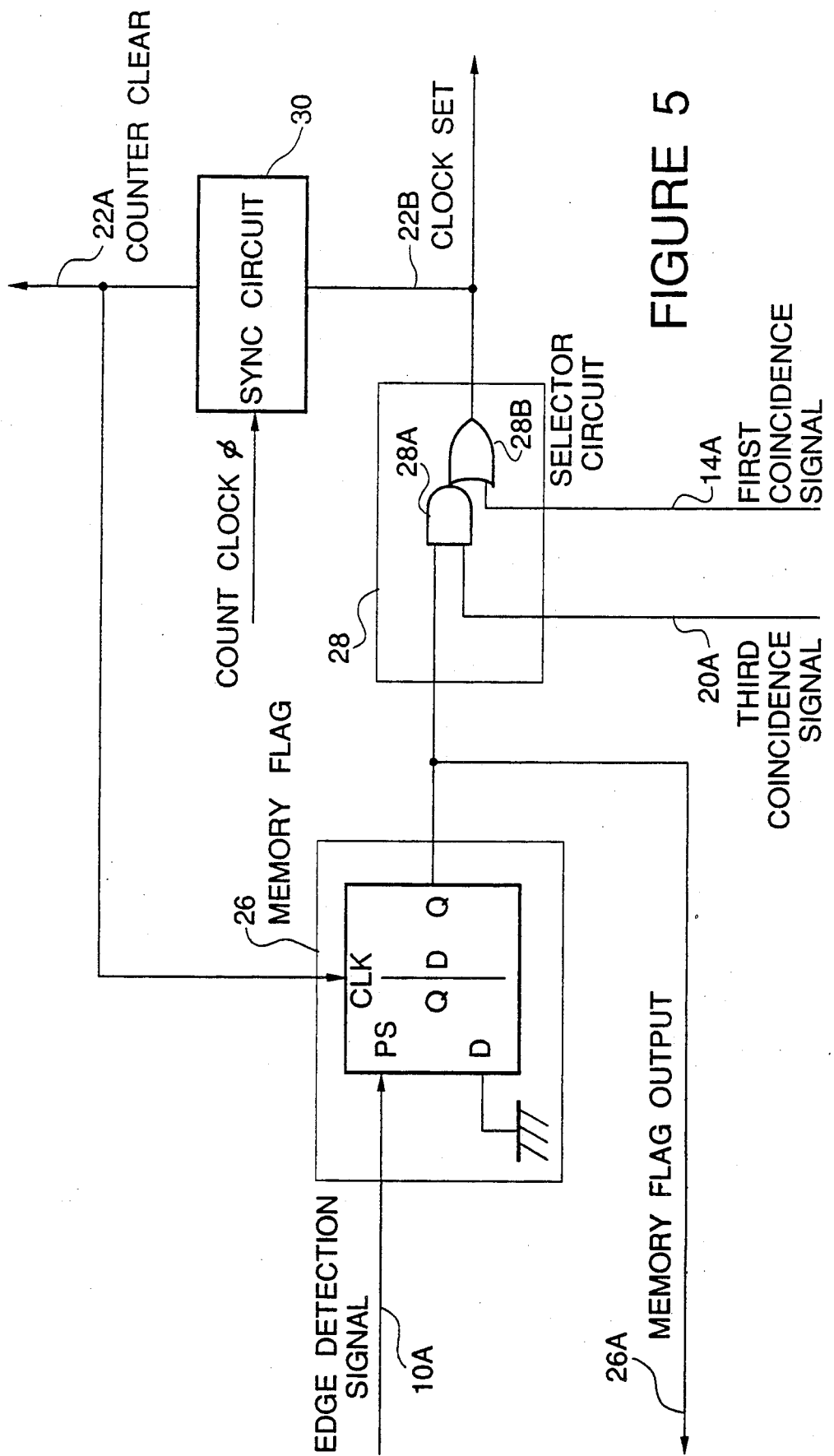
FIG. 5 is a block diagram of the counter clear circuit used in the serial clock generating circuit shown in FIG. 4.

Referring to FIGS. 4 and 5, a block diagram of a second embodiment of the serial clock generating circuit in accordance with the present invention is shown in FIG. 4, and a block diagram of the counter clear circuit used in the second embodiment of the serail clock generating circuit is shown in FIG. 5. In FIGS. 4 and 5, elements similar to those shown in FIGS. 1 and 2 are given the same Reference Numerals, and explanation thereof will be omitted.

As seen from comparison between FIGS. 1 and 4, the second embodiment includes a AND gate 32 having a first and non-inverted input connected to an output of the edge detector 10 and an output connected as the edge detection signal to the capture/comparison register 20 and the counter clear circuit 22. The AND gate 32 has a second and inverted input connected to an output 26A of the memory flag 26 of the counter clear circuit 22. Therefore, whether or not the edge detection signal of the edge detector 10 is supplied as the capture trigger signal to the capture/comparison register 20 is controlled by the output 26A of the memory flag 26 of the counter clear circuit 22. The other points and operation are the same as the first embodiment.

As seen from comparison between FIGS. 2 and 5, the counter clear circuit shown in FIG. 5 is different from the circuit shown in FIG. 2 in only one point in which the output 26A of the memory flag 26 is taken out of the ccounter clear circuit 22.

Therefore, explanation will be made on only points of the second embodiment different from the first embodiment.

In the second embodiment, the occurrence of the level transition of the received serial data is stored in the memory flag 26 shown in FIG. 5. Thereafter, when the counter clear signal 22A is generated so as to activate the output signal 26A of the memory flag 26, the AND gate 32 is closed, so that the edge detection signal from the edge detector 10 is not applied to the capture/comparison register 20. Namely, the capture operation of the capture/comparison register 20 is inhibited. At this time, the presetting of the low place bit of the memory flag 26 is also inhibited.

Furthermore, when the counter 12 is cleared by the third coincidence signal 20A of the capture/comparison register 20, the memory flag 26 is also cleared so that the output 26A of the memory flag 26 is rendered inactive. As a result, the capture operation of the capture/comparison register 20 is allowed, again, and the presetting of the low place bit of the memory flag 26 is also allowed.

Accordingly, in the second embodiment, once the level transition of the received serial data is stored in the memory flag 26 shown in FIG. 5 and the correction value of the counter is captured and stored in the capture/comparison register 20, the capture/comparison register 20 will not capture the next count value of the counter 12 until the compensation of the count value is executed.

As seen from the above, in the second embodiment, if the level transition of the received serial data occurs and the value of the counter is captured and stored in the capture/comparison register 20, even if a new level transition of the received serial data occurs before the phase compensation is executed, the count value of the counter will not be captured and stored in the capture/comparison register 20. The phase correction information first stored is surely maintained until the phase compensation operation is performed.

Figure 6:
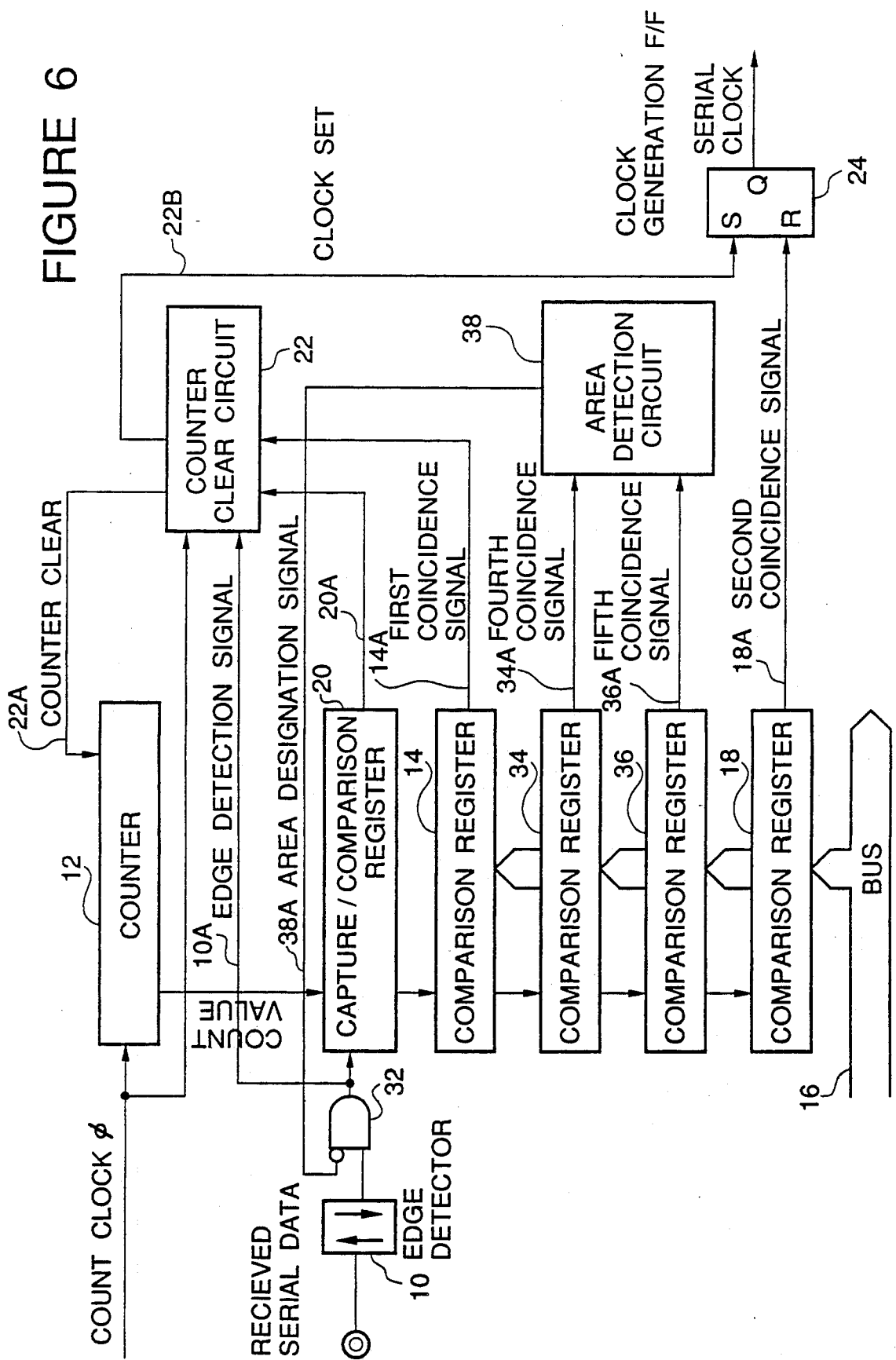
FIG. 6 is a block diagram of a third embodiment of the serial clock generating circuit in accordance with present invention.

Now, a third embodiment of the serail clock generating circuit will be explained with reference to FIG. 6. In FIG. 6, element similar to those shown in FIGS. 1 and 4 are given the same Reference Numerals, and explanation thereof will be omitted for simplification of the description.

The third embodiment shown in FIG. 6 has, in addition to the basic construction similar to the first embodiment, two additional comparison registers 34 and 36 for comparing the count value of the counter with respective predetermined reference values at each time the counter countes the count clock, and for outputting fourth and fifth coincidence signals 34A and 36A, and an area detection circuit 38 receiving the fourth and fifth coincidence signals 34A and 36A for discriminating in which area the count value of the counter 12 is. An area designation signal 38A outputted from the area detection circuit 38 is connected to the second and inverted input of the AND gate 32 located between the edge detector 10 and the capture/comparison register 20. Therefore, only when the area designation signal 38A outputted from the area detection circuit 38 is active, the AND gate 32 allows the capture/comparison register 20 to capture the count value of the counter 12 in response to the edge detection signal from the edge detector 10.

With the above mentioned additional arrangement, the signal level transition detected when the count value òf the counter is within a particularly defined area is regarded as noise, so that the phase compensation of the serial clock is generated is suppressed. Namely, a control function for noise is added.

Similarly to the first embodiment, the comparison register 14, 18, 34 and 36 are respectively set with the first, second, fourth and fifth reference numbers through the bus 16 in a software manner by a central processing unit (not shown) of a microcomputer used in a data processing system (not shown) including the shown serial clock generating circuit. Therefore, the comparison registers 14, 18, 34 and 36 can be respectively set with arbitrary reference numbers.

However, the comparison registers 14, 18, 34 and 36 are respectively set with reference numbers which fulfil such a relation that the set value of the comparison register 34 is less than the set value of the comparison register 18, which is less than the set value of the comparison register 36, which is less than the set value of the comparison register 14. For example, the comparison register 14 is set with a basic count number of the counter 12, namely, a maximum count value of the counter 12. Therefore, the set value of the comparison register 14 determines one period of the serial clock generated.

$$\frac{\text{Frequency of Count clock}}{\text{Serial Transfer Rate}} - 1$$

(Therefore, in the shown embodiment, $16-1=15$) Furthermore, the comparison register 18 is set with a half of the basic count number of the counter 12. Therefore, the set value of the comparison register 18 determines a duty of the serial clock generated.

$$\frac{\text{Frequency of Count clock}}{\text{Serial Transfer Rate}} \times (1/2) - 1$$

(Therefore, in the shown embodiment, $16/2-1=7$)

On the other hand, the comparison register 34 is set with a lower limit of the correction value of the counter 12 set in the capture/comparison register 20.

$$\frac{\text{Frequency of Count clock}}{\text{Serial Transfer Rate}} \times (1/4) - 1$$

(Therefore, in the shown embodiment, $16/4-1=3$)

In addition, the comparison register 36 is set with an upper limit of the correction value of the counter 12 set in the capture/comparison register 20.

$$\frac{\text{Frequency of Count clock}}{\text{Serial Transfer Rate}} \times (3/4) - 1$$

(Therefore, in the showm embodiment, $16\times3/4-1=11$)

Figure 7:
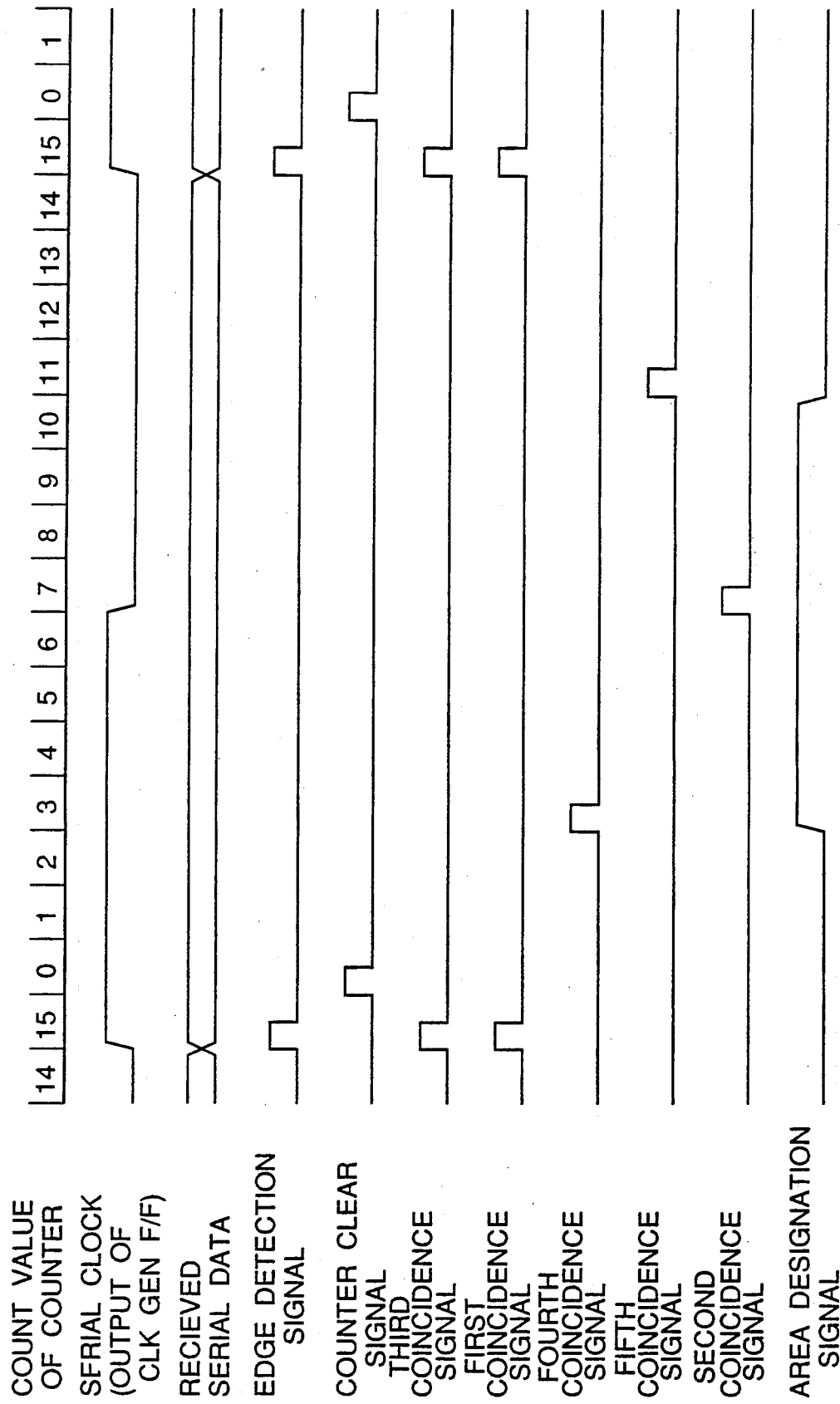
FIG. 7 is a timing chart illustrating the operation of the serial clock generating circuit shown in FIG. 6.

In the case that the first, second, fourth and fifth reference numbers as metioned above are set to the comparison registers 14, 18, 34 and 36, these comparison registers generates the first, second, fourth and fifth coincidence signals 14A, 18A, 34A and 36A at a timing as shown in FIG. 7 as compared with the advancement of the count value of the counter 12. Namely, when the count value of the counter 12 becomes "3", the fourth coincidence signal 34A of "1" is generated, and when the count value of the counter 12 becomes "7", the second coincidence signal 18A of "1" is generated. In addition, when the count value of the counter 12 becomes "11", the fifth coincidence signal 36A of "1" is generated, and when the count value of the counter 12 becomes "15", the first coincidence signal 14A of "1" is generated.

The area detection circuit 38 is composed of for example a latch circuit, and activates the area detection signal 38A on the basis of the fourth and fifth coincidence signals 34A and 36A when the count value of the counter 12 is in an extent of "3" to "10" as shown in FIG. 7.

The counter clear circuit 22 of the third embodiment is the same as those of the first and second embodiments, and therefore, explanation will be omitted.

Now, an operation of the third embodiment of the serial clock generating circuit shown in FIG. 6 will be explained with reference to FIG. 7.

First, the following is the relation between the serial clock and the count value of the counter 12 under the condition in which the serial data is precisely transferred at a transfer rate predetermined in a data transfer system (one sixteenth of the count clock $\phi$ in the shown embodiment) and the received serial data is perfectly in phase with the count clock $\phi$. In addition, assume that the signal level transition has not occurred on the received serial data as an initial condition. Namely, the memory flag 26 of the counter clear circuit 22 does not store the edge detection signal 10A.

Since the count clock $\phi$ is set to be at a frequency 16 times of the serial data transfer rate, if the counter 12 start its count operation from the count value "0" as shown in FIG. 7, when the count value of the counter 12 reaches the fourth reference number "3" set in the fourth comparison register 34, the fourth coincidence signal 34A is generated by the comparison register 35 and applied to the area detection circuit 38.

With advancement of the count operation, when the count value of the counter 12 reaches the second reference number "7" set in the second comparison register 18, the second coincidence signal 18A is generated and therefore, the clock generation flipflop 24 is reset so that the serial clock is brought to "0".

Thereafter, when the count value of the counter 12 reaches the fifth reference number "11" set in the fifth comparison register 36, the fifth coincidence signal 36A is generated by the comparison register 36 and applied to the area detection circuit 38.

With further advancement of the count operation, when the count value of the counter 12 reaches the first reference number "15" set in the first comparison register 14, the first coincidence signal 14A is supplied to the counter clear circuit 22, which generates the clock set signal 22B to the set terminal of the clock generation flipflop 24 so that the serial clock is brought "1". The counter clear circuit 22 generates the counter clear signal 22A at the counting timing of the counter 12 next to the generation of the first coincidence signal 14A. Thus, the counter 12 is cleared to "0" and therefore, the counter restarts its count operation from "0".

In this case, since the transfer rate of the serial data is precisely one-sixteenth of the count clock $\phi$, the timing of the level transition of the received serial data is perfectly consistent with the timing of one period of the serial clock generated.

In other words, the period of time from the moment that the counter 12 starts its count operation from the count value "0" to the moment that the count clear signal 22A is generated, corresponds to a reception time for one bit of the serial data. In addition, the period of time from the moment that the second coincidence signal 18A is generated by the second comparison register 18 to the moment that the clock set signal 22B is generated, corresponds to one half period of the one bit of the serial data. Therefore, the clock generation flipflop 24 generates the serial clock which falls down at a center of one bit of the serial data.

When the signal level of the received serial data changes from the initial condition after the serial data transfer is started, for example when the signal level of the received data change from, a continuous condition of "1" to "0", or when the serial data transfer timing accidentally slightly changes, a phase deviation of the serial clock is detected and compensated as follows:

When the signal level of the received serial data has changed, if the count value of the counter 12 is in the extent of "0" to "2", since the area designation signal 38A is inactive, the edge detection signal 10A is supplied to the capture/comparison register 20 without being masked by the gate circuit 32. Therefore, the capture/comparison register 20 captures and stores the count value of the counter 12. In addition, the edge detection signal 10A is stored in the memory flag 26 of the counter clear circuit 22.

With advancement of the count operation of the counter 12, when the first coincidence signal 14A of the comparison register 14 is rendered active, the counter clear signal 22A is generated so as to clear the counter 12. Further, after the clock generation flipflop 24 is reset, and the output of the memory flag 26 is rendered active, the count value is compensated.

After the counter 12 starts its count operation "0" again, when the count value of the counter 12 becomes consistent with the stored count value, for example "1" of the capture/comparison register 20, the third coincidence signal 20A is generated by the capture/comparison register 20. At this time, since both the output of the memory flag 26 and the output 38A of the area detection circuit 38 have been already rendered active, the counter clear circuit 22 generates the clock set signal 22B so as to set the clock generation flipflop 24. At the next count timing, the counter clear signal 22A is generated. Therefore, the counter 12 is cleared or returned to "0", and continues its count operation from "0", again.

Accordingly, a compensation of +2 in comparison with the inherent count value (16 in this embodiment) is effected.

Similarly, if the count value captured and stored in the capture/comparison register 20 is "0", a comparison of +1 in comparison with the inherent count value (16 in this embodiment) is effected. On the other hand, if the count value captured and stored in the capture/comparison register 20 is "2", a compensation of +3 in comparison with the inherent count value (16 in this embodiment) is effected.

On the other hand, whem the signal level of the received serial data has changed, if the count value of the counter 12 is in the extent of "11" to "15", since the area designation signal 38A is inactive, the capture/comparison register 20 receives the edge detection signal 10A from the edge detector 10 without being masked by the gate circuit 32, so as to capture and store the count value of the counter 12. In addition, the edge detection signal 10A is stored in the memory flag 26 of the counter clear circuit 22.

With advancement of the count operation of the counter 12, when the first coincidence signal 14A of the comparison register 14 is rendered active, the counter clear signal 22A is generated so as to clear the counter 12. Further, after the clock generation flipflop 24 is reset and the output of the memory flag 26 is rendered active, the count value is compensated.

After the counter 12 starts its count operation from "0" again, when the count value of the counter 12 becomes consistent with the second reference value "7" of the second comparison register 18, the second coincidence signal 20A is generated by the second comparison register 20 so as to reset the clock generation flipflop 24. Thereafter, when the count value of the counter 12 becomes consistent with the stored count value, for example "14" of the capture/comparison register 20, the third coincidence signal 20A is generated by the capture/comparison register 20. At this time, since both he output of the memory flag 26 and the output 38A of the area detection circuit 38 have been already rendered active, the counter clear circuit 22 generates the clock set signal 22B so as to set the clock generation flipflop 24. At the next count timing, the counter clear signal 22A is generated. Therefore, the counter 12 is returned to "0", and continues its count operation from "0", again.

Accordingly, a compensation of −1 in comparison with the inherent count value (16 in this embodiment) is effected.

Similarly, if the count value captured and stored in the capture/comparison register 20 is "13", a compensation of −2 in comparison with the inherent count value (16 in this embodiment) is effected. On the other hand, if the count value captured and stored in the capture/comparison register 20 is "15", a compensation of ±0 in comparison with the inherent count value (16 in this embodiment) is effected. Namely, it means that the serail clock generated is in perfect synchronism with that of the received serial data.

As seen from the above, if the signal transition timing of the received serial data is deviated from the timing in which the count value of the counter 12 is brought to "15", the counter 12 is cleared to "0" so as to compensate the count number, so that the low level outputting time length of the serial clock generated is forcedly changed to effect the phase compensation.

When the signal level of the received serial data has changed, if the count value of the counter 12 is in the extent of "3" to "10", since the area designation signal 38A is active, the edge detection signal 10A is masked by the gate circuit 32 and therefore, is not supplied to the capture/comparison register 20. Therefore, the edge detection signal 10A is not stored in the memory flag 26 of the counter clear circuit 22.

As seen from the above description, the third embodiment is different from the first embodiment in that if the timing of the signal level transition of the received serial data is between when the count value of the counter 12 is at the set reference value "3" of the comparison register 34 and when the count value of the counter 12 is as the set reference value "10" of the comparison register 38, the count number compensation of the counter 12 can be inhibited.

With this feature, it is possible to suppress an abrupt change of phase of the serial clock caused by noise and others on a transmission line. Therefore, it is possible to ensure a duration time of each of the high level and the low level of the serial clock generated, so that an operation margin is ensured for a serial transfer circuit using the serial clock generated.

The third embodiment is characterized by adding the area detection function to the first, embodiment, and can remove a large phase compensation caused by noise of the received serial data.

In the above mentioned third embodiment, the bit length of all the counter 12, the first, second, fourth and fifth comparison registers 14, 18, 34 and 26, and the capture/comparison register 20 is four bits for convenience and simplification of description. However, since the refrnce number or value of each of the four comparison registers can be set in a software manner as mentioned hereinbefore, it is possible to select an arbitrary bit length for all the counter 12, the first second, fourth and fifth comparison registers 14, 18, 34 and 36, and the capture/comparison register 20, on the bases of a required maximum serial data transfer rate and an available count clock frequency.

In addition, in the above mentioned embodiment, the count clock $\phi$ has a frequency 16 times of the serial transfer rate. However, it is possible to use arbitrary frequency which permits equal low level time and high level time of the serial clock generated.

Figure 8:
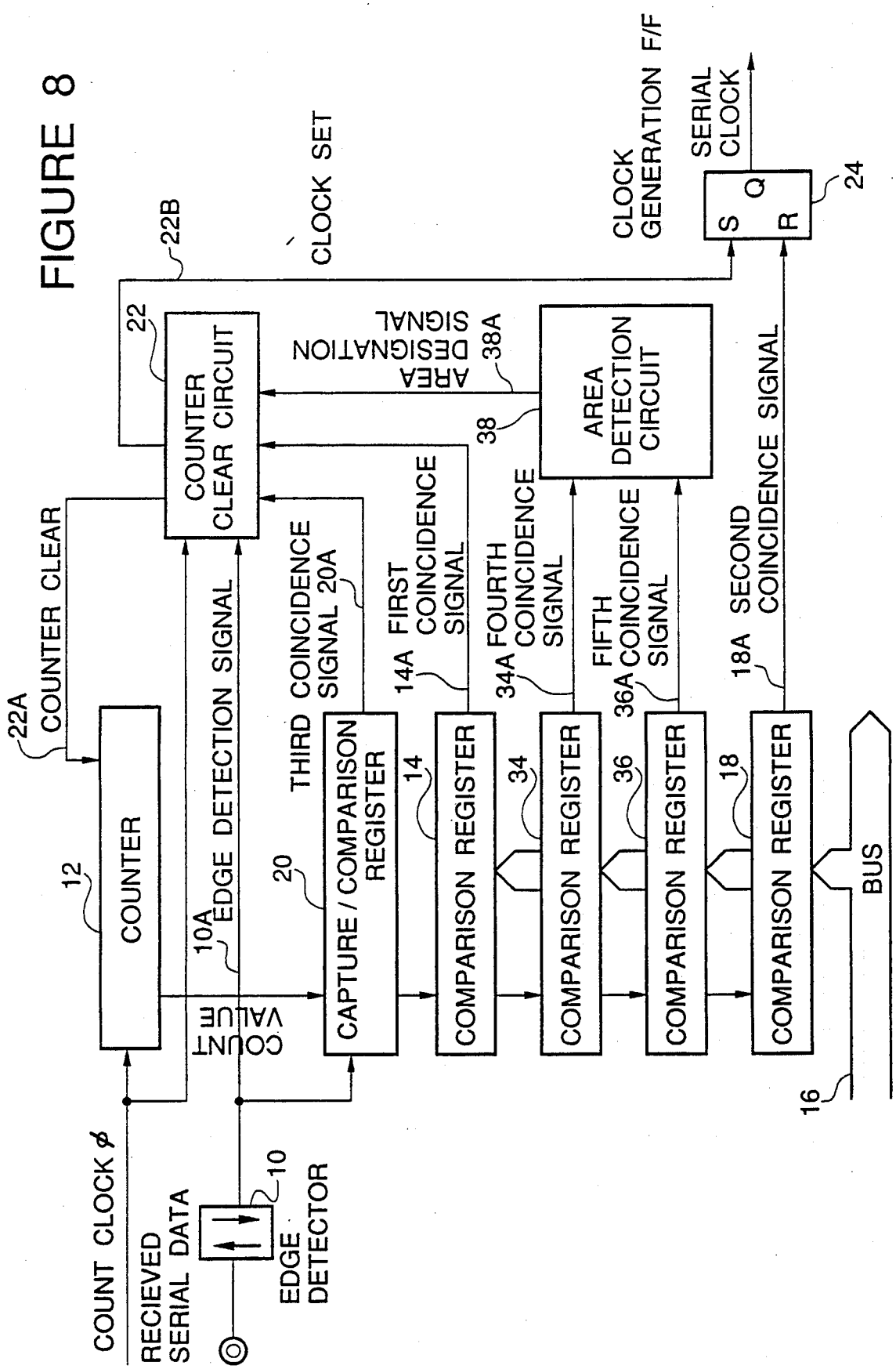
FIG. 8 is a block diagram of a fourth embodiment of the serial clock generating circuit in accordance with the present invention.

Referring to FIG. 8, there is shown a block diagram of a fourth embodiment of the serial clock generating circuit.

The fourth embodiment is featured in that if a signal level transition is first detected when the count value of the counter is in a predetermined extent of value, the first detection of the signal level transition is regarded as having been caused by noise, similarly to the third embodiment, and therefore a phase compensation is suppressed. However, when the count value of the counter is in a predetermined extent of value, if the signal level transition is again detected continuously to the first detection of the signal level transition, phase compensation is executed.

Therefore, in FIG. 8, element similar to those shown in FIG. 6 are given the same Reference Numerals, and explanation thereof will be omitted for simplification of the description.

As seen from comparison between FIGS. 6 and 8, the fourth embodiment shown in FIG. 8 is different from the third embodiment shown in FIG. 6, in that the area detection signal 38A is supplied to the counter clear circuit 22, and the output of the edge detector 10 is directly coupled to the capture/comparison register 20 and the counter clear circuit 22. In addition, the generation timings of the clock set signal 22B and the counter clear signal 22A are different from those of the third embodiment. The other construction and operation are the same as those of the third embodiment, and therefore explanation thereof will be omitted.

Figure 9:
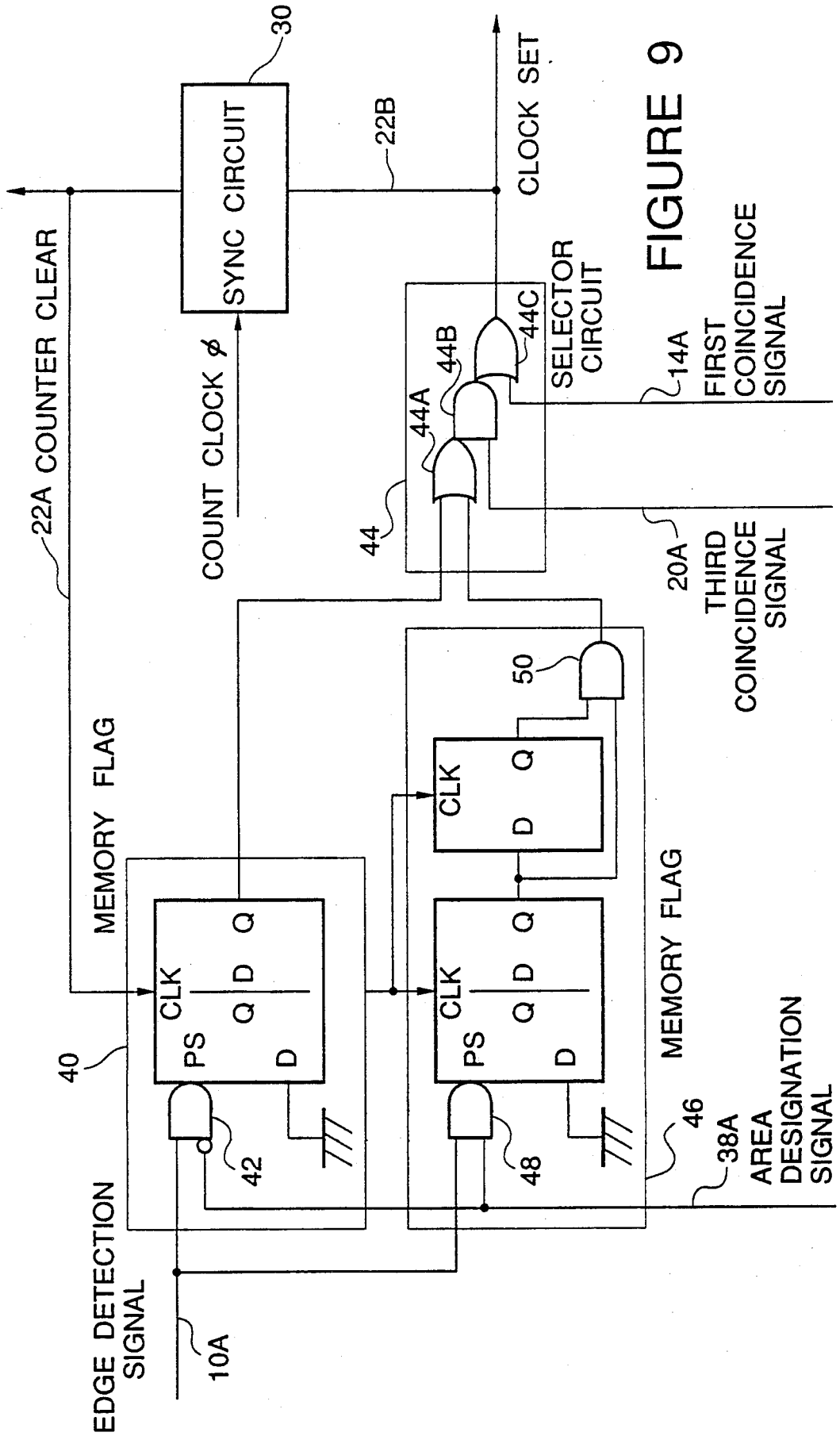
FIG. 9 is a block diagram of the counter clear circuit used in the serial clock generating circuit shown in FIG. 8.

Turning to FIG. 9, there is shown a block diagram of the counter clear circuit used in the serial clock generating circuit shown in FIG. 9. The counter clear circuit shown in FIG. 9 includes a memory flag 40, which can be composed of a 2-bit shift register having a preset function. The 2-bit shift register 40 receives the counter clear signal 22A as a shift clock and also received the edge detection signal 10A through an AND gate 42 having an inverted input connected to receive the area designation signal 38A. Therefore, when the area designation signal 38A is inactive, the 2bit shift register 40 stored the edge detection signal 10A in response to the counter clear signal 22A and then transfers the stored edge detection signal 10A to a selector circuit 44 in response to the counter clear signal 22A.

The counter clear circuit shown in FIG. 9 includes another memory flag 46, which can be composed of a 3-bit shift register having a preset function. The 3-bit shift register 46 receives the counter clear signal 22A as a shift clock and also receives the edge detection signal 10A through an AND gate 48 having an input connected to receive the area designation signal 38A. Therefore, when the area designation signal 38A is active, the 3-bit shift register 46 stores an active edge detection signal 10A in response to the counter clear signal 22A and then transfers or shifts the stored edge detection signal 10A in response to the counter clear signal 22A. Outputs of second and third stages of the 3-bit shift register 46 are coupled to an AND gate 50, which has an output forming an output of the second memory flag 46.

With the above mentioned arrangement, when the area designation signal 38A is inactive, if the edge detection signal 10A is rendered active, a low place bit of the 2-bit shift register 40 is preset with "1". Thereafter, if the counter clear signal 22A is generated to clear the counter 12, the 2-bit shift register 40 shifts its internal bits so that the "1" stored in the low place bit is shifted to a high place bit of the 2-bit shift register 40 and therefore outputted to the selector circuit 4. At this time, the low place bit is brought to "0" and the content of the high place bit before the shift operation is lost.

On the other hand, when the area designation signal 38A is active, if the edge detection signal 10A is rendered active, a lowest place bit or first bit of the 3-bit shift register 46 is preset with "1". Thereafter, if the counter clear signal 22A is generated to clear the counter 12, the 3-bit shift register 46 shifts its internal bits.

At this time, the first bit is brougth to "0" and the content of a highest place bit or a third bit of the 3-bit shift register 46 before the shift operation is lost.

Therefore, when the area designation signal 38A is active, if the edge detection signal 10A is continuously rendered active two times, the AND gate 50 outputs an active memory flag signal of "1" to the selector circuit 44.

The selector circuit 28 is composed of an OR gate 44A having a first input connected to an output of the first memory flag 40 and a second input connected to an output of the second memory flag 46, an AND gate 44B having a first input connected to an output of the OR gate 44A and a second input connected to receive the third coincidence signal 20A, and another OR gate 44C having a first input connected to an output of the AND gate 44B and a second input connected to receive the first coincidence signal 14A. An output of the OR gate 44C generates the clock set signal 22B.

Namely, if either the output of the first memory flag 40 or the output of the second memory flag 46 is active, the clock set signal 22B is generated by the third coincidence signal 20A outputted from the capture/comparison register 20. In addition, the clock set signal 22B is generated by the first coincidence signal 14A outputted from the comparison register 14, regardless of the contents of the memory flags 40 and 46.

The clock set signal 22B is applied to the synchronous circuit 30, which is similar to that of the first embodiment and which receives the count clock $\phi$. This synchronous circuit 30 operates to generate the counter clear signal 22A in response to the clock set signal 22B but is synchronism with the count clock $\phi$. Therefore, the counter clear signal 22A is generated at a timing which is later than the clock set signal 22B by one count clock $\phi$. In other words, the counter 12 is cleared at the counting time of the counter 12 next to the generation of the first or third coincidence signal 14A or 20A.

If the comparison registers 14, 18, 34 and 36 are set similarly to the third embodiment, the area detection circuit 38 shown in FIG. 8 operates to activate the area detection signal 38A on the basis of the fourth and fifth coincidence signals 34A and 36A when the count value of the counter 12 is in an extent of "3" to "10".

When the signal level of the received serial data has changed, if the counter value of the counter 12 is in the extent of "0" to "2" or in the extent of "11" to "15", the count value correction operation or the serial clock generation operation is similar to that of the third embodiment, and therefore, a detailed description will be omitted.

However, when the signal level of the received serial data has changed, if the count value of the counter 12 is in the extent of "3" to "10", the count value correction operation or the serial clock generation operation is different from that of the third embodiment. Therefore, the operation in this case will be explained.

When the signal level of the received serial data changes from the initial condition after the serial data transfer is started, for example when the signal level of the received data change from a continuous condition of "1" to "0", or when the serial data transfer timing accidentally slightly changes, a phase deviation of the serial clock is detected and compensated as follows:

When the signal level of the received serial data has changed, if the count value of the counter 12 is in the extent of "3" to "10", the edge detection signal 10A is supplied to the capture/comparison register 20. Therefore, the capture/comparison register 20 captures and stores the count value of the counter 12. In addition, since the area designation signal 38A is active, the edge detection signal 10A is stored in the memory flag 46 of the counter clear circuit 22. However, since the output of the memory flag 46 is rendered active only when two active edge detection signals are stored continously, the output of the memory flag 46 is still "0" at this time.

With advancement of the count operation of the counter 12, after the counter clear signal 22A is generated so as to clear the counter 12 and the clock generation flipflop 24 is reset, the counter 12 starts its count operation from "0" again. Thereafter, when the signal level of the received serial data has changed, if the count value of the counter 12 is also in the extent of "3" to "10", the edge detection signal 10A is supplied to the capture/comparison register 20. Therefore, the count value of the counter 12 is captured and stored in the capture/comparison register 20. At the same time, since the area designation signal 38A is active, the second edge detection signal 10A is stored in memory flag 46 of the counter clear circuit 22.

The output of the memory flag 46 which has stored the second edge detection signal 10A will be activated after the counter clear signal 22A is generated and the counter 12 is returned to "0" once. Thereafter, with advancement of the count operation of the counter 12, when the count value of the counter 12 becomes consistent with the stored count value of the capture/comparison register 20, the third coincidence signal 20A is generated by the capture/comparison register 20. At this time, the clock generation flipflop 24 is set, and therefore, the count value is compensated.

As seen from the above, the fourth embodiment is different from the third embodiment in addition of the second memory flag 46 in the counter clear circuit 22 and in modification of the selector circuit in the counter clear circuit 22. With this modification, if the timing of the signal level transition of the received serial data is in-between when the count value of the counter 12 is at the set reference value "3" of the comparison register 34 and when the count value of counter 12 is at the set reference value "10" of the comparison register 38, the count number compensation of the counter 12 on the basis of the first detection of signal level transition can be inhibited, similarly to the third embodiment. However, if the above mentioned signal level transitions of the received serial data is continuously detected two times, the count number compensation of the counter 12 is executed.

Therefore, if a signal level transition is first detected when the count value of the counter is in a predetermined extent of value, the first detection of the signal level transition is regarded as having been caused by noise, similarly to the third embodiment, and therefore an abrupt phase change of the serial clock is suppressed. Accordingly, a duration time of each of the high level and the low level of the serial clock generated is ensured, so that an operation margin is ensured for a serial transfer circuit using the serial clock generated.

In the above mentioned fourth embodiment, the second memory flag 46 of the counter clear circuit 22 is composed of 3-bit shift register so that when the signal level transition is continuously detected two times the count correction is performed. However, it should be understood that the bit length of the second memory flag is limited to the three bits. For example, the memory flag can be formed of a counter circuit, so that only when the signal level transition fulfilling the above mentioned condition is continuously detected N times or more, it is judged that the serial clock is out of phase and therefore the count number correction is performed so as to synchronize the serial clock. In this case, a simple phase locked loop is formed, which can be used in various applications.

Figure 10:
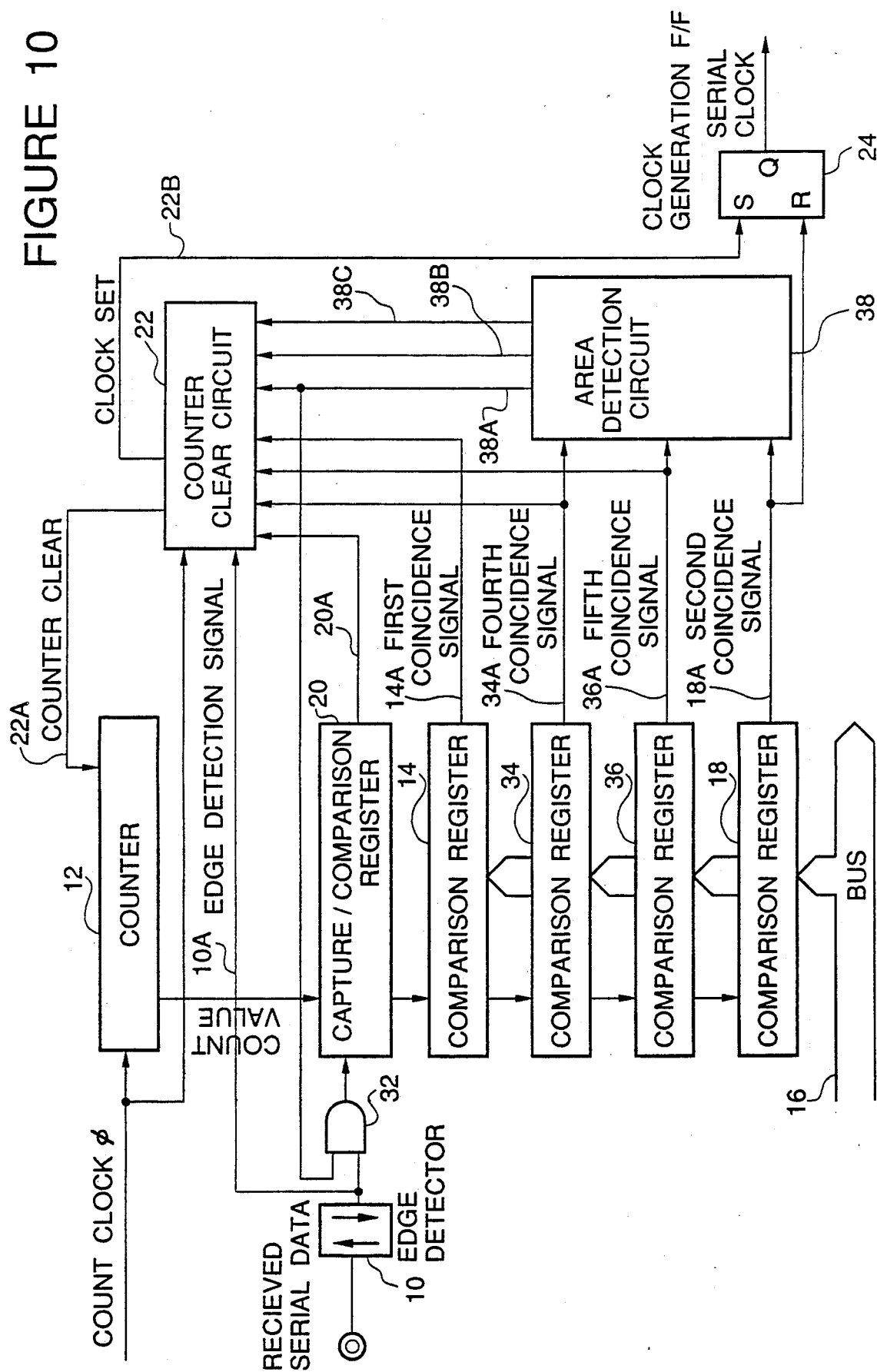
FIG. 10 is a block diagram of a fifth embodiment of the serial clock generating circuit in accordance with present invention.

Referring to FIG. 10, there is shown a block diagram of the fifth embodiment of the serial clock generating circuit in accordance with the present invention.

In applications such as phase locked loops, a speed-up of phase correction between a received data and a serial clock is needed, and a less jitter due to noise is desired. For this purpose, a difference amount such as a phase advance or a phase lag is detected and a required correction amount is adjusted. In this fifth embodiment, a phase difference between the received data and the serial clock generated is detected on the basis of area information outputted from an area detection circuit.

The fifth embodiment shown in FIG. 10 has, in addition to the basic construction similar to the first embodiment, three additional comparison registers for comparing the count value of the counter with respective predetermined reference values at each time the counter counts the count clock, and for outputting respective coincidence signals when coincidence is obtained, and an area detection circuit receiving the coincidence signals from these comparison registers for discriminating in which area the count value of the counter. With this, when the count value of the counter is in a specific extent of value, the amount of correction is adjusted on the basis of the detected signal transition point of the received data. Therefore, even if the signal transition point of the received data is detected at a midpoint of the received data expected, the detected signal transition point is dealt with as an effective information, so that a minute amount of phase correction is performed. Therefore, the fifth embodiment can be said to be a modification of the first embodiment and the third embodiment.

Therefore, in FIG. 10, elements similar or corresponding to those shown in FIG. 6 are given the same Reference Numerals. As seen from comparison between FIGS. 6 and 10, only only the respective outputs of the comparison registers 34 and 36 but also the output of the comparison register 18 are connected to the area detection circuit 38. The area detection circuit 38 outputs first, second and third area detection signals 38A, 38B and 38C to the counter clear circuit 22. In addition, the outputs of the comparison registers 34 and 36 are connected to the counter clear circuit 22. The output of the edge detector 10 is coupled through an AND gate 32 to the capture/comparison register 20, but directly to the counter clear circuit 22. The AND gate 32 is controlled by the first area detection signal 38A. Therefore, only when the first area designation signal 38A outputted from the area detection circuit 38 is active, the AND gate 32 allows the capture/comparison register 20 to capture the count value of the counter 12 in response to the edge detection signal from the edge detector 10.

Similarly to the third embodiment, the comparison registers 14, 18, 34 and 36 are respectively set with the first, second, fourth, and fifth reference numbers through the bus 16 in a software manner by a central processing unit (not shown).

However, the comparison registers 14, 34, 36 and 18 are respectively set with reference numbers which fulfil such a relation that the set value of the comparison register 34 is less than the set value of the comparison register 18, which is less than the set value of the comparison register 36, which is less than the set value of the comparison register 14. For example, the comparison registers 34, 18, 36 and 14 are respectively set with "3", "7", "11" and "15", respectively, similarly to the third embodiment.

Therefore, when the count value of the counter 12 becomes "3", the fourth coincidence signal 34A of "1" is generated, and when the count value of the counter 12 becomes "7", the second coincident signal 18A of "1" is generated. In addition, when the count value of the counter 12 becomes "11", the fifth coincidence signal 36A of "1" is generated, and when the count value of the counter 12 becomes "15", the first coincidence signal 14A of "1", is generated.

Figure 12:
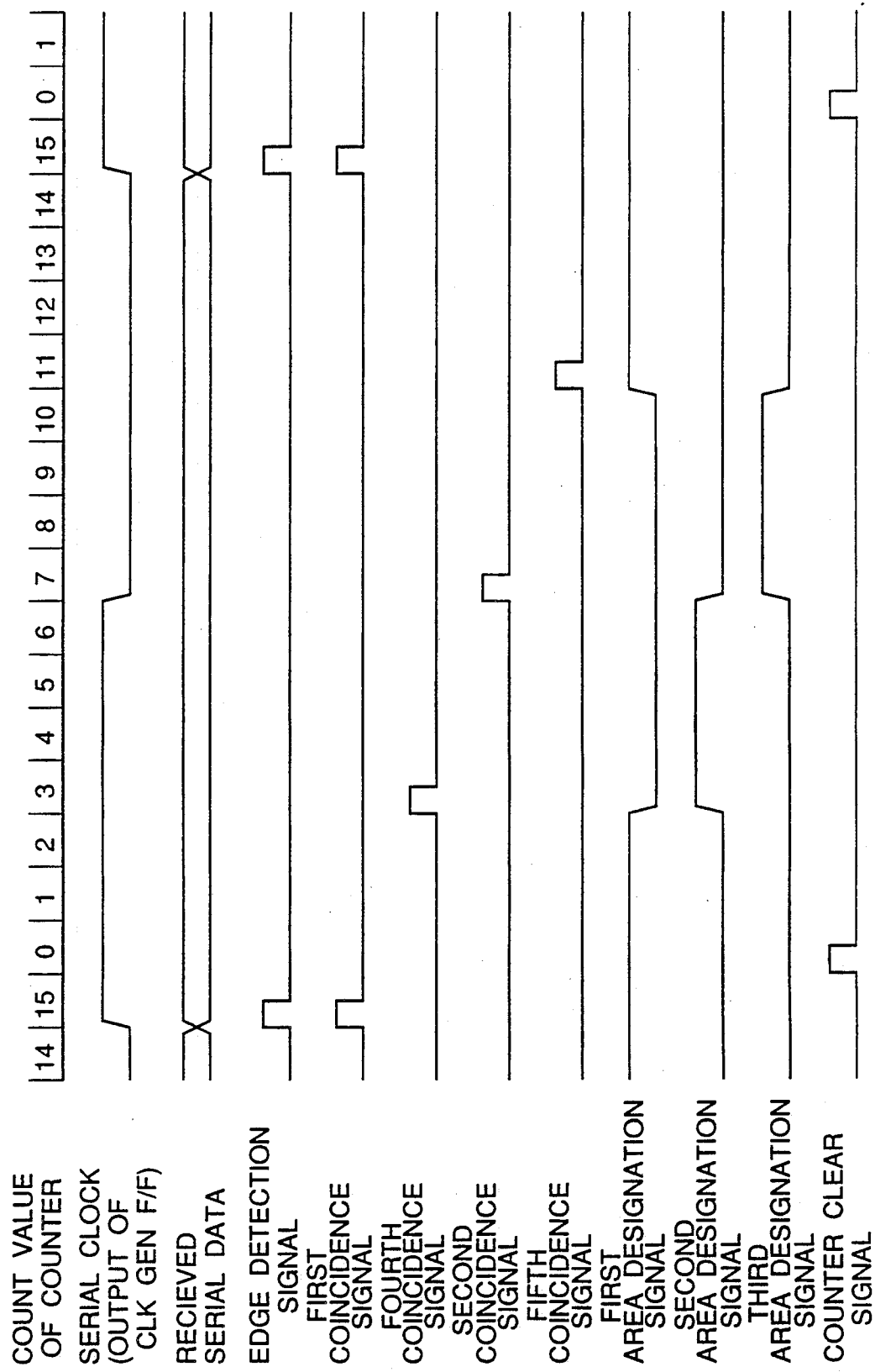
FIG. 12 is a timing chart illustrating the operation of the serial clock generating circuit shown in FIG. 10.

The area detection circuit 38 is composed of for example a latch circuit, and activates the first to third area detection signals 38A to 38C on the basis of the second, fourth and fifth coincidence signals 18A, 34A and 36A as shown in FIG. 12. Namely, when the count value of the counter 12 is in an extent of "3" to "6", the area detection signal 38B is generated. When the count value of the counter 12 is in an extent of "7" to "12", the area detection signal 38C is generated. When the count value of the counter 12 is in an extent of "13" to "15" or in an extent of "0" to "2", the area detection signal 38A is generated.

Figure 11:
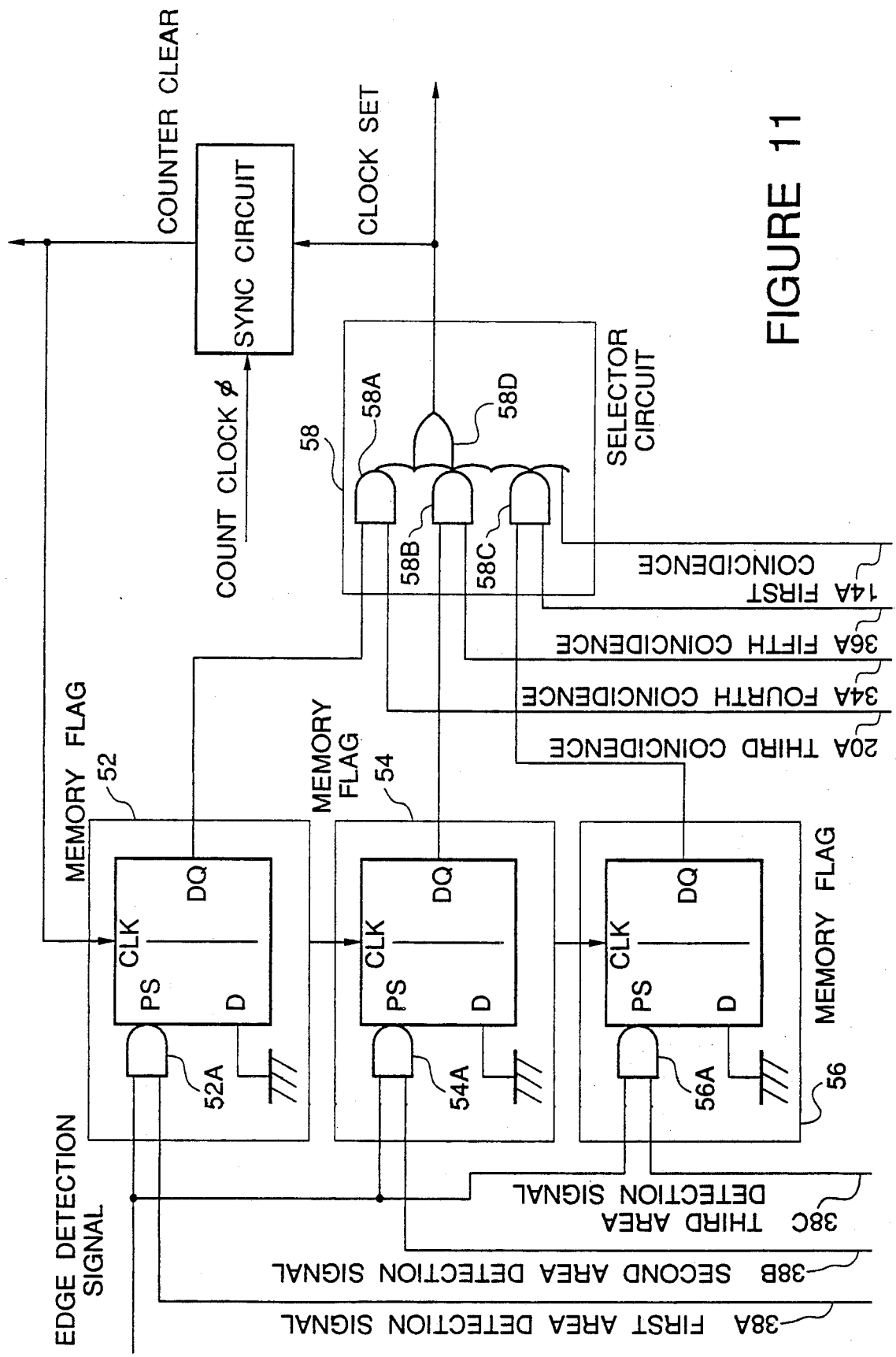
FIG. 11 is block diagram of the counter clear circuit used in the serial clock generating circuit shown in FIG. 10.

Turning to FIG. 11, there is shown a block diagram of the counter clear circuit 22 used in the fifth embodiment. The counter clear circuit 22 includes three memory flags 52, 54 and 56, each of which can be composed of a 2-bit shift register having a preset function and an AND gate located at an input of the 2-bit shift register. Each 2-bit shift register receives the counter clear signal 22A as a shift clock and also receives the edge detection signal 10A through an associated AND gate 52A, 54A or 56A. When each 2-bit shift register receives the edge detection signal 10A through the associated AND gate, the -bit shift register stored the received edge detection signal 10A in response to the counter clear signal 22A and then transfers the stored edge detection signal 10A to a selector circuit 58 in response to the counter clear signal 22A.

The associated AND gates 52A, 54A and 56A coupled to receive the first, second and third area detection signals 38A, 38B and 38C, respectively. Therefore, when the first area detection signal 38A is active, if the edge detection signal 10A is activated, the active detection signal 10A is stored in the memory flag 52. When the second area detection signal 38B is active, if the edge detection signal 10A is activated, the active detection signal 10A is stored in the memory flag 54. When the first area detection signal 38C is active, if the edge detection signal 10A is activated, the active detection signal 10A is stored in the memory flag 56.

More specifically, a low place bit of each memory flag is preset with "1", when the edge detection signal 10A is rendered active, if the corresponding area detection signal is active. Thereafter, if the counter clear signal 22A is generated to clear the counter 12 each memory flag shifts its internal bits so that the data stored in the low place bit is shifted to a high place bit of the memory flag 26 and therefore outputted to the selector circuit 28. At this time, the low place bit is brought to "0" and the content of the high place bit before the shift operation is lost.

Accordingly, the memory flags 58, 54 and 56 separately store information concerning in what count value of the counter 12 and the signal level transition of the received serial data occurs. The memory flags 52, 54 and 56 shift and output the stored information to the selector circuit 58.

The selector circuit 58 is composed of three AND gates 58A, 58B and 58C and an OR gate 58D receiving an output of each AND gate and the first coincidence signal 14A. An output of the OR gate 58D generates the clock set signal 22B. A first AND gate 58A is connected to receive an output of the first memory flag 52 and the third coincidence signal 20A. A second AND gate 58B is connected to receive an output of the second memory flag 54 and the fourth coincidence signal 34A. A third AND gate 56 is connected to receive an output of the third memory flag 56 and the fifth coincidence signal 34A.

Accordingly, if the output of the first memory flag 52 is active, the clock set signal 22B is generated by the third coincidence signal 20A outputted from the capture/comparison register 20. If the output of the second memory flag 54 is active, the clock set signal 22B is generated by the fourth coincidence signal 34A outputted from the fourth comparison register 34. Furthermore, if the output of the third memory flag 56 is active, the clock set signal 22B is generated by the fourth coincidence signal 36A outputted from the fifth comparison register 36. In addition, the clock set signal 22B is generated by the first coincidence signal 14A outputted from the comparison register 14, regardless of the contents of the three memory flags 52, 54 and 56.

The clock set signal 22B is applied to the synchronous circuit 30, which is the same as that of the first embodiment and which receives the count clock $\phi$. Therefore, this synchronous circuit 30 will not be explained here.

Now, an operation of the fifth embodiment of the serial clock generating circuit shown in FIG. 10 will be explained with reference to FIG. 12.

First, the following is the relation between the serial clock and the count value of the counter 12 under the condition in which the serial data is precisely transferred at a transfer rate predetermined in a data transfer system (one sixteenth of the count clock $\phi$ in the shown embodiment) and the received serial data is perfectly in phase with the count clock $\phi$. In addition, assume that the signal level trasition has not occurred on the received serial data as an initial condition. Namely, the memory flag 52, 54 and 56 of the counter clear circuit 22 do not store the edge detection signal 10A.

Since the count clock $\phi$ is set to be at a frequency 16 times of the serial data transfer rate, if the counter 12 starts its count operation from the count value $\phi$ as shown in FIG. 12, when the count value of the counter 12 reaches the fourth reference number "3" set in the fourth comparison register 34, the fourth coincidence signal 34A is generated by the comparison register 34 and applied to the counter clear circuit 22 and the area detection circuit 38. However, since the internal memory flag 54 of the counter clear circuit 22 is inactive, the clock set signal 22B and the counter clear signal 22A are not generated.

With advancement of the count operation, when the count value of the counter 12 reaches the second reference number "7" set in the second comparison register 18, the second coincidence signal 18A is generated and therefore, the generated second coincidence signal 18A is supplied to the area detection circuit 38 and the clock generation flipflop 24 is reset so that the serial clock is brought to "0".

Thereafter, when the count value of the counter 12 reaches the fifth reference number "11"set in the fifth comparison register 36, the fifth coincidence signal 36A is generated by the comparison register 36 and applied to the area detection circuit 38 and the counter clear circuit 22. However, at this time, since the internal memory flag 54 of the counter clear circuit 22 is inactive, the clock set signal 22B and the counter clear signal 22A are not generated.

With further advancement of the count operation, when the count value of the counter 12 reaches the first reference number "15" set in the first comparison register 14, the first coincidence signal 14A is supplied to the counter clear circuit 22, which generates the clock set signal 22B to the set terminal of the clock generation flipflop 24 so that the serial clock is brought to "1". The counter clear circuit 22 generates the counter clear signal 22A at the counting timing of the counter 12 next to the generation of the first coincidence signal 14A. Thus, the counter 12 is cleared to "0" and therefore, the counter restarts its count operation from "0".

In this case, since the transfer rate of the serial data is precisely one-sixteenth of the count clock $\phi$, the timing of the level transition of the received serial data is perfectly consistent with the timing of one period of the serial clock generated.

In other words, the period of time from the moment that the counter 12 starts its count operation from the count value "0" to the moment that the count clear signal 22A is generated, corresponds to a reception time for one bit of the serial data. In addition, the period of time from the moment that the second coincidence signal 18A is generated by the second comparison register 18 to the moment that the clock set signal 22B is generated, corresponds to one half period of the one bit of the serial data. Therefore, the clock generation flipflop 24 generates the serial clock which falls down at a center of one bit of the serial data.

When the signal level of the received serial data changes from the initial condition after the serial data transfer is started, for example when the signal level of the received data change from a continuous condition of "1" to "0", or when the serial data transfer timing accidentially slightly changes, a phase deviation of the serial clock is detected and compensated as follows:

When the signal level of the received serial data has changed, if the count value of the counter 12 is in the extent of "0" to "2", since the first area designation signal 38A is active, the edge detection signal 10A is supplied to the capture/comparison register 20 without being masked by the gate circuit 32. Therefore, the capture/comparison register 20 captures and stores the count value of the counter 12. In addition, the edge detection signal 10A is stored in the first memory flag 52 of the counter clear circuit 22.

However, since the output of the first memory flag 52 is rendered active after the counter clear signal 22A is generated, when the first coincidence signal 14A of the first comparison register 14 is rendered active with advancement of the count operation of the counter 12, the counter clear signal 22A is generated so as to clear the counter 12, and the clock generation flipflop 24 is set. Thereafter, the count value is compensated.

After the counter 12 starts its count operation from "0" again, when the count value of the counter 12 becomes consistent with the stored count value, for example "1" of the capture comparison register 20, the third coincidence signal 20A is generated by the capture/comparison register 20. At this time, since both the output of the first memory flag 52 and the first area detection signal 38A have been already rendered active, the counter clear circuit 22 generates the clock set signal 22B so as to set the clock generation flipflop 24. At the next count timing, the counter clear signal 22A is generated. Therefore, the counter 12 is cleared to "0", and continues its count operation from "0", again.

Accordingly, a compensation of +2 in comparison with the inherent count value (16 in this embodiment) is effected.

Similarly, if the count value captured and stored in the capture/comparison register 20 is "0", a compensation of +1 in comparison with the inherent count value (16 in this embodiment) is effected. On the other hand, if the count value captured and stored in the capture/comparison register 20 is "2", a compensation of +3 in comparison with the inherent count value (16 in this embodiment) is effected.

On the other hand, when the signal level of the received serial data has changed, if the count value of the counter 12 is in the extent of "13" to "15", since the first area designation signal 38A is also inactive, the capture/comparison register 20 receives the edge detection signal 10A from the edge detector 10 without being masked by the gate circuit 32, so that the count value of the counter 12 is captured and stored in the capture/comparison register 20. In addition, the edge detection signal 10A is stored in the first memory flag 52 of the counter clear circuit 22.

However, since the output of the first memory flag 52 is rendered active after the counter clear signal 22A is generated, when the first coincidence signal 14A of the first comparison register 14 is rendered active with advancement of the count operation of the counter 12, Further, after the counter clear signal 22A is generated so as to clear the counter 12, and the clock generation flipflop 24 is reset, the count value is compensated.

After the counter 12 starts its count operation from "0" again, when the count value of the counter 12 becomes consistent with the second reference value "7" of the second comparison register 18, the second coincidence signal 20A is generated by the second comparison register 20 so as to reset the clock generation flipflop 24. Thereafter, when the count value of the counter 12 becomes consistent with the stored count value, for example "14" of the capture/comparison register 20, the third coincidence signal 20A is generated by the capture/comparison register 20. At this time, since both the output of the first memory flag 52 and the first area detection signal 38A have been already active, the counter clear circuit 22 generates the clock set signal 22B so as to set the clock generation flipflop 24. At the next count timing, the counter clear signal 22A is generated. Therefore, the counter 12 is returned to "0", and continues its count operation from "0", again.

Accordingly, a compensation of −1 in comparison with the inherent count value (16 in this embodiment) is effected.

Similarly, if the count value captured and stored in the capture/comparison register 20 is "13", a compensation of −2 in comparison with the inherent count value (16 in this embodiment) is effected. On the other hand, if the count value captured and stored in the capture/comparison register 20 is "15", a compensation of ±0 in comparison with the inherent count value (16 in this embodiment) is effected. Namely, it means that the serial clock generated is in perfect synchronism with that of the received serial data.

When the signal level of the received serial data has changed, if the count value of the counter 12 is in the extent of "3" to "6", since the second area designation signal 38B is active, the edge detection signal 10A is stored in the second internal memory flag 54 of the counter clear circuit 20.

However, since the output of the second memory flag 54 is rendered active after the counter clear signal 22A is generated, when the first coincidence signal 14A of the first comparison register 14 is rendered active with advancement of the count operation of the counter 12, the counter clear signal 22A is generated so as to clear the counter 12. Furthermore, after the clock generation flipflop 24 is reset, the count value is compensated.

After the counter 12 starts its count operation from "0" again, when the count value of the counter 12 becomes consistent with the set count value, for example "3" of the fourth comparison register 34, the fourth coincidence signal 34A is generated. At this time, since both the output of the second memory flag 54 and the second area detection signal 38B have been already rendered active, the counter clear circuit 22 generates the clock set signal 22B so as to set the clock generation flipflop 24. At the next count timing, the counter clear signal 22A is generated. Therefore, the counter 12 is cleared to "0", and continues its count operation from "0", again.

Accordingly, a compensation of +4 in comparison with the inherent count value (16 in this embodiment) is effected. In addition, this correction value of +4 is fixed if the count value of the counter 12 is in the extent of "3" to "6" when the signal level transition occurs in the received serial data.

Furthermore, when the signal level of the received serial data has changed, if the count value of the counter 12 is in the extent of "7" to "12", since the third area designation signal 38C is active, the edge detection signal 10A is stored in the third internal memory flag 56 of the counter clear circuit 20.

However, since the output of the third memory flag 56 is rendered active after the counter clear signal 22A is generated, when the first coincidence signal 14A of the first comparison register 14 is rendered active with advancement of the count operation of the counter 12, the counter clear signal 22A is generated so as to clear the counter 12. Furthermore, after the clock generation flipflop 24 is reset, the count value is compensated.

After the counter 12 starts its count operation from "0" again, when the count value of the counter 12 becomes consistent with the set count value "7" of the second comparison register 18, the second coincidence signal 18A is generated. Therefore, the clock generation flipflop 24 is reset. Thereafter, when the count value of the counter 12 becomes consistent with the set count value, for example "12" of the fifth comparison register 36, the fifth coincidence signal 36A is generated. At this time, since both the output of the third memory flag 56 and the third area detection signal 38C have been already rendered active, the counter clear circuit 22 generates the clock set signal 22B so as to set the clock generation flipflop 24. At the next count timing, the counter clear signal 22A is generated. Therefore, the counter 12 is cleared to "0", and continues its count operation from "0", again.

Accordingly, a compensation of −3 in comparison with the inherent count value (16 in this embodiment) is effected. In addition, this correction value of −3 is fixed if the count value of the counter 12 is in the extent of "7" to "12" when the signal level transition occurs in the received serial data.

As seen from the above, the fifth embodiment is different from the first embodiment in that, if the signal level transition of the received serial data occurs when the count value of the counter 12 is in the extent of "3" to "12", the count correction amount of the counter is fixed. This is for the following purpose: firstly a duration time of each of the high level and the low level of the serial clock generated is ensured, so that an operation margin is ensured for a serial transfer circuit using the serial clock generated; and secondly, an abrupt phase change of the serial clock due to noise on a transmission line and others is avoided.

Therefore, in the fifth embodiment, the count value correction of the counter 12 cannot be completed one time when the transfer rate is abruptly changed. Therefore, the count value correction of the counter 12 is repeated with any value in the extent of −3 to +4. Accordingly, under noisy situation, it is possible to synchronize the serial clock so that the signal level transition of the received serial data is made consistent with the timing of the count value "15" of the counter 12.

The invention has thus been shown and described with reference to the specific embodiments. However, it should be noted that the present invention is in no way limited to the details of the illustrated structures but changes and modifications may be made within the scope of the appended claims.

We claim:

1. A serial clock generating circuit for generating a serial clock in phase with a clock included in a received serial data on the basis of an input clock having a frequency N times of a serial data transfer rate of the received serial data, comprising means for detecting a level transition of the received serial data so as to generate a level transition detection signal, means for counting the input clock first comparison means for comparing a count value of the count means with a first programmable predetermined value at each one counting operation of the count means, so as to generate a first coincidence signal when the count value of the count means if coincident with the first programmable predetermined value, second comparison means for comparing the count value of the count means with a second programmable predetermined value at each one counting operation of the count means so as to generate a second coincidence signal when the count value of the count means is coincident with the second programmable predetermined value, third comparison means having a first function of capturing and storing the count value of the count means when the level transition detection signal is generated, and a second function of comparing the count value of the count means with the stored count value at each one counting operation of the count means, so as to generate a third coincidence signal when the count value of the count means is coincident with the stored count value, means for generating a clear signal to the count means so as to clear the count means when either the first coincidence signal or the third coincidence signal is generated, and means for generating a serial clock signal on the basis of the second coincidence signal and the clear signal.

2. A serial clock generating circuit claimed in claim 1 wherein first programmable predetermined value is larger than the second programmable predetermined value, and wherein the serial clock generating means is composed of a flipflop having a set terminal connected to the clear signal, a reset terminal connected to received the second coincidence signal and an output terminal generating the serial clock, so that if the level transition timing of the received serial data is deviated from the timing in which the count value of the count means is brought to a maximum count value, the count means is cleared so as to compensate its count number, whereby a low level outputting time length of the flipflop is forcedly changed to effect a phase compensation of the serial clock.

3. A serial clock generating circuit claimed in claim 2 wherein the clear signal generating means receives the input clock, the level transition detection signal, and the first and third coincidence signals for generating a clock set signal to the set terminal of the flipflop when first coincidence signal is received or when third coincidence signal is received after the level transition detection signal is generated, the clear signal generating means generating the clear signal in synchronism with the input clock after the clock set signal is generated.

4. A serial clock generating circuit claimed in claim 3 wherein the clear signal means includes a shift register receiving the level transition detection signal and shifting and outputting the level transistion detection signal in response to the clear signal, an logic gate receiving the level transition detection signal from the shift register and the first and third coincidence signals so as to output as the clock set signal the third coincidence signal when the level transition detection signal from the shift register is active and the first coincidence signal regardless of the level transition detection signal from the shift register, and a synchronous circuit receiving the clock set signal and the input clock so as to generate the clear signal in synchronism with the input clock received just after the clock set signal is generated.

5. A serial clock generating circuit claimed in claim 4 wherein the level transition signal of the level transition detection means is supplied to the third comparing means through an gate controlled by the output of the shift register of the clear signal generating means, whereby, if the level transition of the received serial data occurs and the value of the count means is captured and stored in the third comparison means, even if a new level transition of the received serial data occurs before the phase compensation is executed, the count value of the count means will not be captured and stored in the third comparison means.

6. A serial clock generating circuit claimed in claim 4 further including fourth comparison means for comparing a count value of the count means with a fourth programmable predetermined value at each one counting operation of the count means, so as to generate a fourth coincidence signal when the count value of the count means is coincident with the fourth programmable predetermined value , fifth comparison means for comparing the count value of the count means with a fifth programmable predetermined value at each one counting operation of the count means, so as to generate a fifth coincidence signal when the count value of the count means is coincident with the fifth programmable predetermined value, and area detection means coupled to receive at least the fourth and fifth coincidence signals and coupled to receive at least the fourth and fifth coincidence signals and coupled to the third comparison means so as to block the third comparison means from storing the count value of the count means in response to the level transition detection signal when the level transition occurs in a predetermined area.

7. A serial clock generating circuit claimed in claim 6 wherein the area detection means is coupled to the clear signal generating means and controls the clear signal generating means so as to inhibit the change of the low level outputting time length of the flipflop in response to a first occurrence of the level transition in a predetermined area, but to permit the change of the low level outputting time length of the flipflop in response to a second continuous occurrence of the level transition in a predetermined area.

* * * * *